(12) United States Patent
Saputra et al.

(10) Patent No.: US 12,436,558 B2
(45) Date of Patent: Oct. 7, 2025

(54) HYBRID CLOCKING SCHEME FOR SERDES PHYSICAL LAYER CIRCUITS

(71) Applicant: QUALCOMM Incorporated, San Diego, CA (US)

(72) Inventors: Nitz Saputra, San Diego, CA (US); Sameer Wadhwa, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 86 days.

(21) Appl. No.: 18/509,643

(22) Filed: Nov. 15, 2023

(65) Prior Publication Data

US 2025/0155917 A1    May 15, 2025

(51) Int. Cl.
G06F 1/08    (2006.01)

(52) U.S. Cl.
CPC ........................... G06F 1/08 (2013.01)

(58) Field of Classification Search
CPC .......................................................... G06F 1/08
See application file for complete search history.

(56) References Cited

U.S. PATENT DOCUMENTS

| | | | | |
|---|---|---|---|---|
| 5,495,513 A * | 2/1996 | Ramirez | ................ | H03K 3/037 377/111 |
| 9,577,848 B1 * | 2/2017 | Chattopadhyay | ........ | H04B 1/16 |
| 9,692,440 B1 * | 6/2017 | Onishi | .................... | G05F 3/262 |
| 9,715,996 B2 * | 7/2017 | Son | ......................... | H05H 1/46 |
| 10,102,889 B2 * | 10/2018 | Bartling | ................ | G06F 1/3234 |
| 10,454,462 B1 * | 10/2019 | Chan | ..................... | H03K 17/687 |
| 11,050,416 B1 * | 6/2021 | Liu | ........................... | H03K 5/06 |
| 11,909,406 B1 * | 2/2024 | Hussein | ................... | H03L 7/093 |
| 2003/0090339 A1 * | 5/2003 | Yu | ......................... | H03H 7/0115 333/167 |
| 2007/0275684 A1 * | 11/2007 | Harada | .................... | H03D 7/14 455/185.1 |
| 2013/0154698 A1 * | 6/2013 | Bottelli | ................. | H03L 7/0816 327/157 |
| 2016/0094227 A1 | 3/2016 | Kawai et al. | | |
| 2016/0134266 A1 * | 5/2016 | Cohen | .................... | H03L 7/0812 327/158 |

(Continued)

FOREIGN PATENT DOCUMENTS

KR    100505617 B1    9/2005

OTHER PUBLICATIONS

International Search Report and Written Opinion—PCT/US2024/053429—ISA/EPO—Mar. 3, 2025.

*Primary Examiner* — Faisal M Zaman
(74) *Attorney, Agent, or Firm* — Loza & Loza, LLP

(57) ABSTRACT

A first inverter in a clock generation circuit is coupled to an input clock signal and has multiple driver slices. Each driver slice includes first transistors that have gates coupled to the input clock signal, second transistors that have sources coupled to rails of a power supply. Each of the second transistors has a drain coupled to a source of one of the first transistors. The second transistors are turned on or turned off based on signaling state of a differential enable signal. A tuning resistor is coupled to the drains of the first transistors and further coupled to an output of the first inverter. A second inverter outputs a quadrature version of the input clock signal and has an input coupled to the output of the first inverter. A first tunable capacitor is coupled to the output of the first inverter.

9 Claims, 10 Drawing Sheets

(56) References Cited

U.S. PATENT DOCUMENTS

| | | | |
|---|---|---|---|
| 2017/0075378 A1* | 3/2017 | Ogasawara | H04B 15/06 |
| 2017/0222789 A1* | 8/2017 | Hailu | H03H 17/08 |
| 2019/0104088 A1* | 4/2019 | Qin | H04L 25/03885 |
| 2019/0123728 A1* | 4/2019 | Zhao | H04L 7/033 |
| 2019/0158091 A1* | 5/2019 | Dash | H03K 19/01855 |
| 2020/0119726 A1* | 4/2020 | Malakar | H03K 5/1252 |
| 2022/0131561 A1 | 4/2022 | Hsu | |
| 2023/0246649 A1 | 8/2023 | Wang et al. | |
| 2024/0146498 A1* | 5/2024 | Moon | G06F 1/04 |
| 2024/0372535 A1* | 11/2024 | Weil | H03K 5/1565 |
| 2024/0427371 A1* | 12/2024 | He | G06F 1/10 |

\* cited by examiner

HYBRID CLOCKING SCHEME FOR SERDES PHYSICAL LAYER CIRCUITS

TECHNICAL FIELD

The present disclosure generally relates to a clock generation circuit and, more particularly, to circuitry for generating phase versions of clock signals.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high-speed bus interface for communication of signals between hardware components.

High-speed serial buses offer advantages over parallel communication links when, for example, there is demand for reduced power consumption and smaller footprints in integrated circuit (IC) devices. In a serial interface, data is converted from parallel words to a serial stream of bits using a serializer and is converted back to parallel words at the receiver using a deserializer. For example, the high-speed bus interface may be implemented using a Peripheral Component Interconnect Express (PCIe) bus, Universal Serial Bus (USB) or Serial Advanced Technology Attachment (SATA), among others.

IC devices may include a serializer/deserializer (SERDES) to transmit and receive through a communication link. In high-speed applications, timing of the operation of a SERDES may be controlled by multiple clock signals. The use of multiple increased frequency clock signals results in increased power consumption. Furthermore, the SERDES generally operates using clock signals that have the same frequency but different phases. Performance, accuracy or reliability of the SERDES may depend on frequency and the phase relationships of the clock signals and drift or other variations in the phase relationships of clock signals can result in errors in received or transmitted data. Therefore, there is an ongoing need for new techniques that provide reliable lower-power clock generation and calibration circuits for components used to receive clock signals over high-speed serial links.

SUMMARY

Certain aspects of the disclosure relate to IC devices that include a bus interface. The bus interface may include a clock generation circuit that can be configured to produce multiphase clock signals for controlling transmissions over a communication bus or for sampling and/or capturing data from signals transmitted over the communication bus.

In various aspects of the disclosure, the clock generation circuit has a first inverter coupled to an input clock signal, second inverter that has an input coupled to the output of the first inverter and that outputs a quadrature version of the input clock signal, and a first tunable capacitor coupled to the output of the first inverter. The first inverter includes driver slices, where each driver slice in the first inverter has a first pair of transistors that have gates that are coupled to the input clock signal, a second pair of transistors and a first tuning resistor coupled to the drains of the first pair of transistors and further coupled to an output of the first inverter. The second pair of transistors includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors. The second pair of transistors is turned on when a first differential enable signal is in a first signaling state and turned off when the first differential enable signal is in a second signaling state.

In various aspects of the disclosure, a method for generating clock signals includes turning on a number of driver slices in a first inverter that is coupled to an input clock signal and configuring a first tunable capacitor coupled to the output of the first inverter to obtain a quadrature version of the input clock signal at an output of a second inverter that has an input coupled to the output of the first inverter. Each driver slice in the first inverter has a first pair of transistors that have gates that are coupled to the input clock signal, a second pair of transistors, and a first tuning resistor coupled to the drains of the first pair of transistors and further coupled to an output of the first inverter. The second pair of transistors includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors. The second pair of transistors is turned on when a first differential enable signal is in a first signaling state and turned off when the first differential enable signal is in a second signaling state.

In various aspects of the disclosure, an apparatus includes means for configuring a first tuning resistor in a first inverter, including driver slices in the first inverter. Each driver slice in the first inverter has a first pair of transistors that have gates that are coupled to the input clock signal, a second pair of transistors, and a first tuning resistor coupled to the drains of the first pair of transistors and further coupled to an output of the first inverter. The second pair of transistors includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors. The second pair of transistors is turned on when a first differential enable signal is in a first signaling state and turned off when the first differential enable signal is in a second signaling state. The apparatus further includes a second inverter that has an input coupled to the output of the first inverter and that outputs a quadrature version of the input clock signal. The apparatus further includes means for configuring a first tunable capacitor that is coupled to the output of the first inverter to obtain a quadrature version of the input clock signal at an output of a second inverter that has an input coupled to the output of the first inverter.

In certain aspects, the first tunable capacitor and the first tuning resistor in each turned-on driver slice in the first inverter are configured as a resistance-capacitance circuit.

In certain aspects, the first tunable capacitor includes a plurality of switches controlled by a first multibit select signal, and a plurality of capacitors. Each capacitor is configured to be coupled between the output of the first inverter and a voltage rail of the power supply when a corresponding switch in the plurality of switches is turned on.

In certain aspects, the second inverter includes a third pair of transistors that have gates that are coupled to the output of the first inverter, a fourth pair of transistors, a second tuning resistor coupled to the drains of the third pair of transistors and to an output of the second inverter, and a second tunable capacitor coupled to the output of the second inverter. The fourth pair of transistors includes a first transistor that has a source coupled to the higher voltage rail of the power supply and a drain coupled to a source of a first transistor in the third pair of transistors, and a second transistor that has a source coupled to the lower voltage rail of the power supply and a drain coupled to a source of a second transistor in the third pair of transistors. The fourth pair of transistors is turned on when a second differential enable signal is in the first signaling state and turned off when the second differential enable signal is in the second signaling state. The second tunable capacitor includes one or more switches controlled by a second multibit select signal, and one or more capacitors. Each of the one or more capacitors is configured to be coupled between the output of the second inverter and a voltage rail of the power supply when a corresponding switch in the one or more switches is turned on.

In certain aspects, a second tuning resistor couples the input of the second inverter to the output of the first inverter, and a second tunable capacitor coupled to the input of the second inverter. The second tunable capacitor includes one or more switches controlled by a second multibit select signal, and one or more capacitors. Each of the one or more capacitors is configured to be coupled between the input of the second inverter and a voltage rail of the power supply when a corresponding switch in the one or more switches is turned on. The second tuning resistor includes at least one switch controlled by a third select signal, and at least one resistor coupled between the output of the first inverter and the input of the second inverter. The at least one resistor is coupled in parallel with another resistor when the at least one switch is turned on. The second tuning resistor has a fixed resistance value.

DETAILED DESCRIPTION

Figure 1:
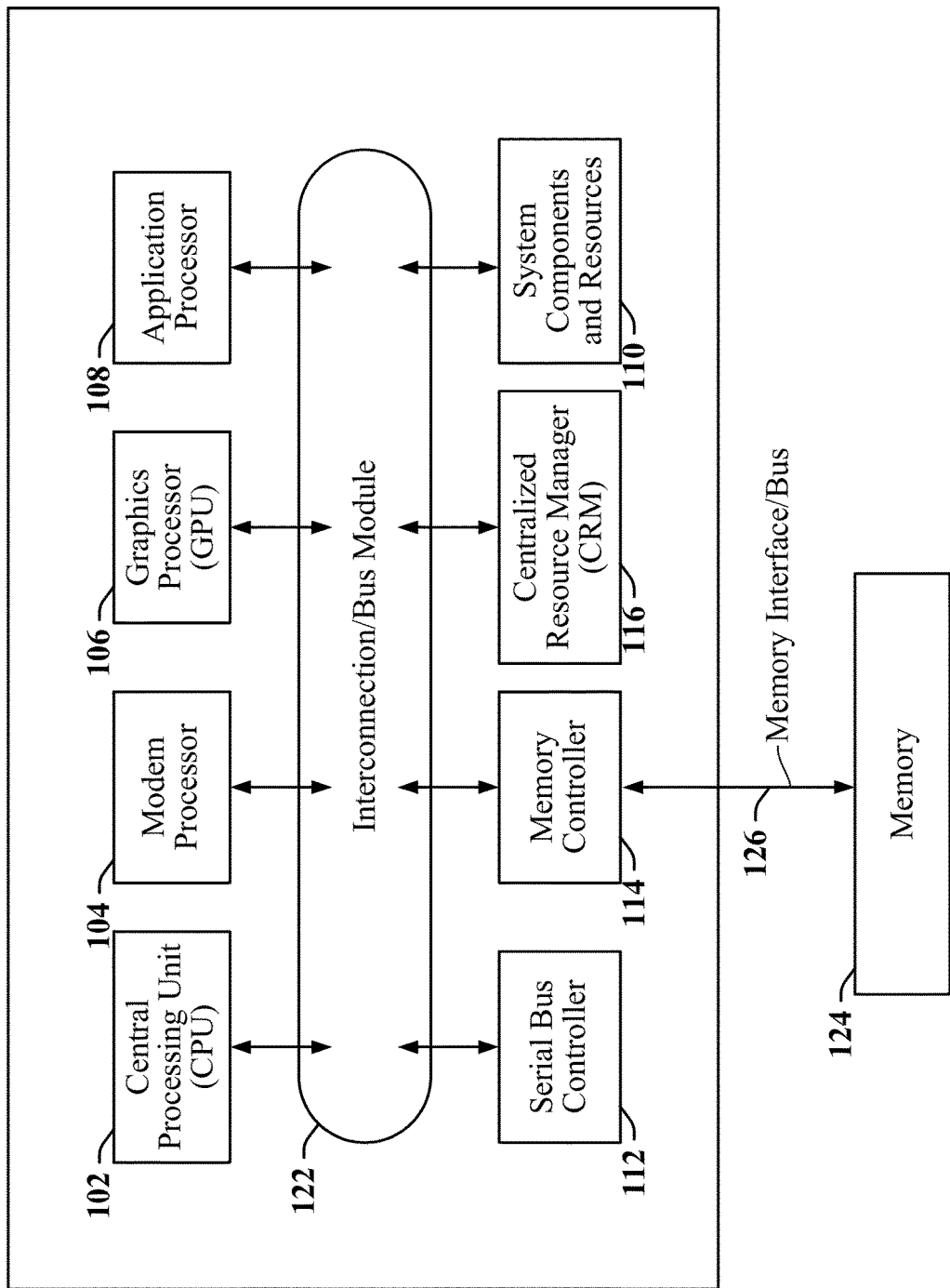
FIG. 1 illustrates an example of a system-on-a-chip in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

Certain aspects of the disclosure are applicable to input/out (I/O) circuits that provide an interface between core circuits and memory devices. Many mobile devices employ Synchronous Dynamic Random Access Memory (SDRAM), including Low-Power Double Data Rate SDRAM, which may be referred to as low-power DDR SDRAM, LPDDR SDRAM or, in some instances, LPDDRx where x describes the technology generation of the LPDDR SDRAM. Later generations of LPDDR SDRAM designed to operate at higher operating frequencies may employ lower voltage levels in the core of an SoC or memory device to mitigate for increased power associated with the higher operating frequencies.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred to as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

Certain examples clock generation circuits are disclosed herein. Certain clock generation circuits are illustrated as being implemented using certain combinations of P-type metal-oxide-semiconductor (PMOS) transistors and N-type metal-oxide-semiconductor (NMOS) transistors. These circuits are provided by way of example only, and it is contemplated that the concepts disclosed herein can be implemented in circuits that use different combinations of NMOS and PMOS transistors. Circuits that include NMOS and PMOS transistors are typically coupled to the rails of a power supply. The power supply provides a current that flows from a higher voltage rail to a lower voltage rail. A rail may include some combination of conductors, wires, connectors and other types of interconnect. For the purposes of this description, the higher voltage rail may be referenced as "VDD" or "$V_{DD}$" and the lower voltage rail may be referred to as Ground. In some implementations, power may be provided to certain circuits through more than two rails.

FIG. 1 illustrates an example of an apparatus 100 in which certain components and interconnections are implemented in an SoC. The SoC may include or be coupled to a memory interface/bus 126 that can be adapted according to certain aspects of the present disclosure. The apparatus 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The apparatus 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The apparatus 100 may further include a serial bus controller 112 such as a Universal Serial Bus (USB) controller, one or more memory controllers 114, and a centralized resource manager (CRM) 116. The apparatus 100 may also include an input/output module (not illustrated) for communicating with resources external to the SoC, each of which may be shared by two or more of the internal SoC components.

The processors 102, 104, 106, 108 may be interconnected to the serial bus controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high-performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from a memory 124 via the memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the apparatus 100.

Figure 2:
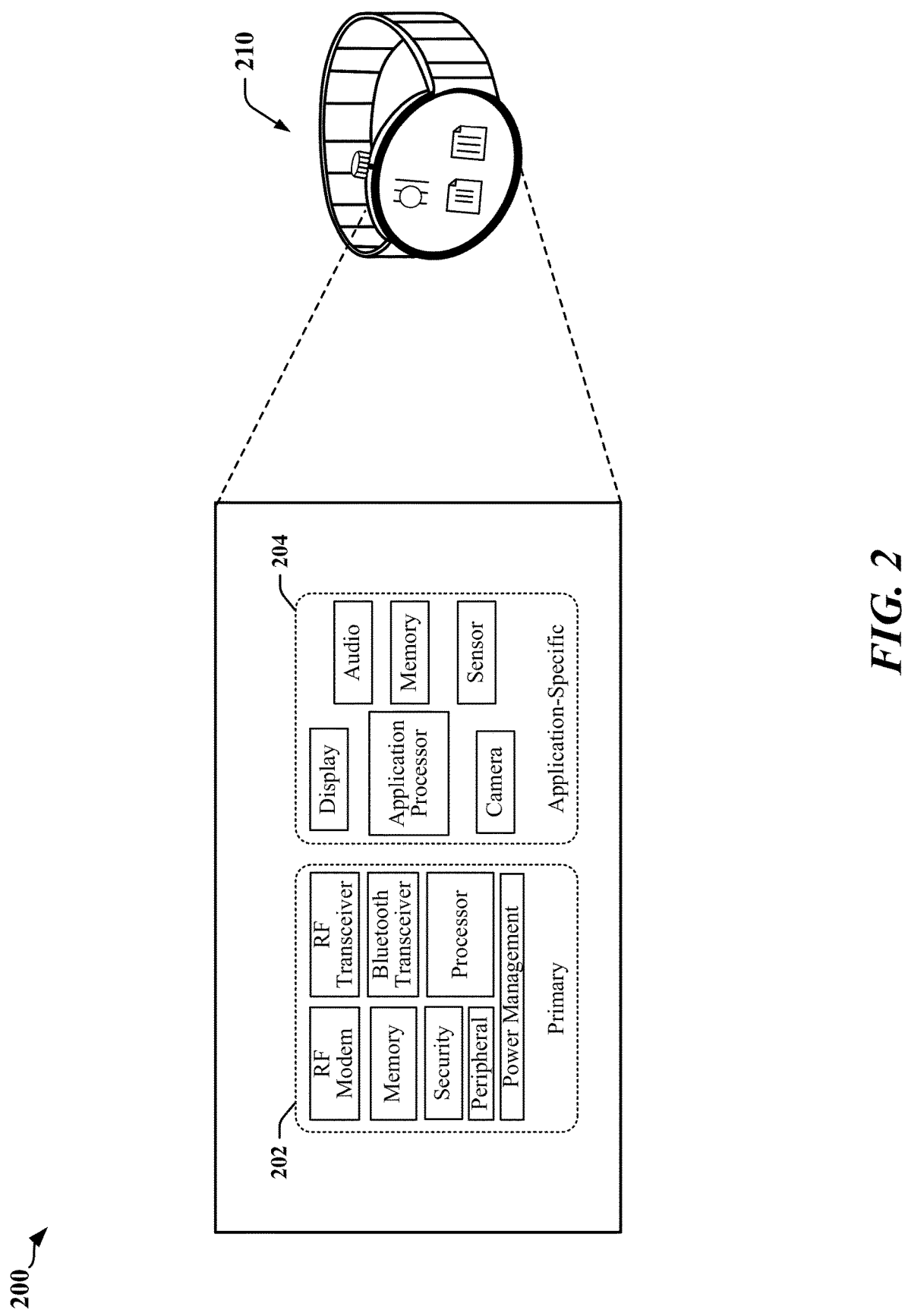
FIG. 2 illustrates an apparatus employing interconnected chiplets.

FIG. 2 illustrates an example of an apparatus 200 in which certain components are implemented using multiple chiplets that are interconnected using one or more data communication buses. In one example, the apparatus 200 may be enclosed within a wearable device a portable or wearable processing and/or communication device (each of which being referred to herein as a portable communication device or PCD), sensors, instruments, appliances and other such devices include one or more ICs. These devices may include mobile phones, tablet computers, palmtop computers, portable digital assistants (PDAs), portable game consoles, and other portable electronic devices such as the illustrated smartwatch 210. PCDs commonly contain integrated circuits or SoCs that include numerous components or subsystems designed to work together to deliver functionality to a user. The various SoC subsystems may communicate with each other via one or more intra-chip data buses or similar data communication interconnects. PCDs may have multiple SoCs that communicate with each other via similar inter-chip interconnects. The ICs are typically packaged in an IC package, which may be referred to as a "semiconductor package" or "chip package." The IC package typically includes a package substrate and one or more IC chips or other electronic modules mounted to the package substrate to provide electrical connectivity to the IC chips. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

Chiplet technology can be used to address some of the performance, power and size design requirements for complex SoCs used in certain mobile or wearable devices. The block diagram in FIG. 2 illustrates certain aspects of an apparatus 200 that can be constructed using chiplets. The apparatus 200 may be configured by selecting a combination of chiplets that implement certain subsystems or distinct functional elements. In the illustrated example, the apparatus 200 includes a set of primary chiplets 202 that enable the apparatus 200 to perform core processing, security and communication functions. The set of primary chiplets 202 include a processor, memory and one or more modems. The illustrated apparatus 200 also includes a set of application-specific chiplets 204 that includes an application processor, display driver, camera interface and audio controller. In a remote sensing device or appliance, the audio-visual components could be omitted and may be replaced with analog-to-digital controllers, for example.

The apparatus 200 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets. The chiplets included in the apparatus 200 can be proprietary or may be acquired from a variety of sources. An SoC may be constructed from chiplets manufactured at different process nodes and/or operated at different voltages.

Figure 3:
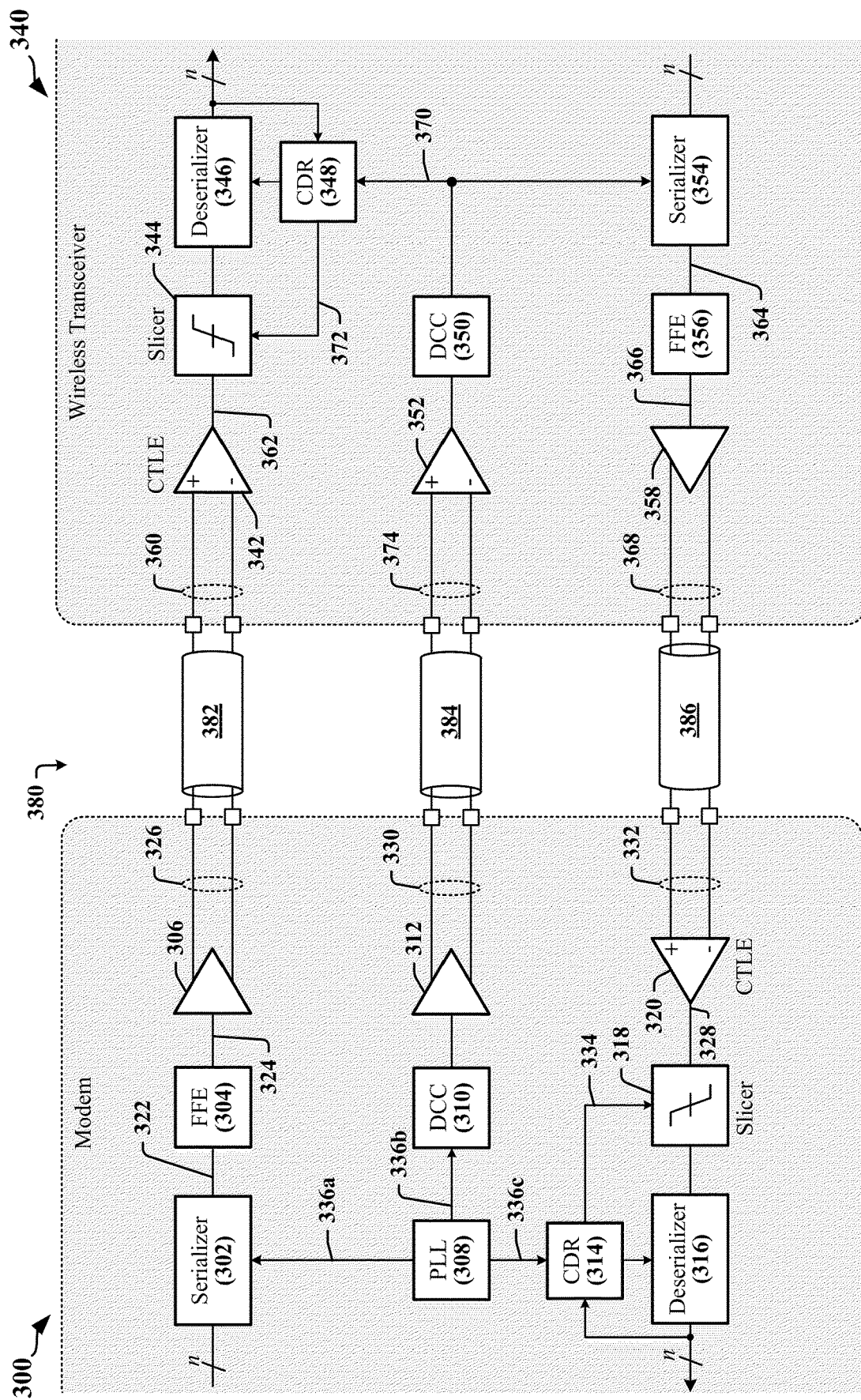
FIG. 3 illustrates an example of a system that employs a multi-channel data communication link.

FIG. 3 illustrates an example of a system that employs a multi-channel data communication link 380 to couple a modem 300 with a wireless transceiver 340. The data communication link 380 includes data channels 382 and 386 and a clock channel 384 that provide a transmission medium through which signals propagate between devices. In the illustrated example, a modem 300 transmits data in a first signal over a first data channel 382 to a wireless transceiver 340 and receives data in a second signal transmitted over a second data channel 386. Data signals are transmitted over the data channels 382 and 386 in accordance with timing information provided by a bus clock signal 330 transmitted over the clock channel 384.

The modem 300 may include a serializer 302 configured to convert n-bit parallel data elements, bytes or words into a serial data stream for transmission in a transmit data signal 322 over the first data channel 382. The transmit data signal 322 may be preconditioned by a pre-equalizing circuit, such as the illustrated digital feed-forward equalizer (the FFE 304), in order to combat or compensate for signal distortions attributable to inter-symbol interference (ISI), reflection and other effects that can be expected to limit bandwidth in first data channel 382. The preconditioned transmit data signal 324 output by the FFE 304 is provided to a driver circuit 306 that is configured drive the first data channel 382.

The modem 300 may include a serializer 302 configured to convert n-bit parallel data elements, bytes or words into a serial data stream for transmission in a serialized data signal 322. The serialized data signal 322 may be preconditioned by a pre-equalizing circuit, such as the illustrated digital feed-forward equalizer (the FFE 304), in order to combat or compensate for signal distortions attributable to inter-symbol interference (ISI), reflection and other effects that can be expected to limit bandwidth in the first data channel 382. A preconditioned data signal 324 output by the FFE 304 is provided to a driver circuit 306 that is configured generate and transmit a differential transmit data signal 326 over the first data channel 382. For the purposes of this disclosure, a differential signal includes two complementary signals that are phase-shifted by 180° with respect to one another.

The wireless transceiver 340 can be configured to process a data signal 360 received over the first data channel 382. The data signal 360 may be provided to a differential receiver 342, which may include or cooperate with an equalizing circuit. In one example, continuous time linear equalization (CTLE) may be used to compensate for certain losses experienced in the first data channel 382. The first data channel 382 may be characterized in some respects as a low-pass filter. In the illustrated example, the differential receiver 342 outputs an equalized data signal 362 that is sampled by a slicer 344. The slicer 344 may be implemented using a D-flipflop or the like and may be configured to capture signaling state of the equalized data signal 362 under the control of edges in a sampling clock signal 372 generated by a clock and data recovery (CDR) circuit 348. The output of the slicer 344 may be provided to a deserializer 346 that is clocked in accordance with one or more clock signals provided by the CDR circuit 348. The CDR circuit 348 may be configured to delay or phase shift a receiver clock signal 370 to ensure that edges in the sampling clock signal 372 are timed to optimize sampling reliability.

In the illustrated wireless transceiver 340, the receiver clock signal 370 is derived from a received bus clock signal 374 from the clock channel 384. A differential receiver 352 coupled to the clock channel 384 may be configured to equalize the received bus clock signal 374, and a duty cycle correction circuit 350 may be used to adjust the duty cycle of the receiver clock signal 370. The receiver clock signal 370 is provided to a serializer 354 that is configured to convert n-bit parallel data elements, bytes or words into a serial data stream for transmission in a serialized data signal 364. The serialized data signal 364 may be preconditioned by a pre-equalizing circuit, such as the illustrated FFE 356, in order to combat or compensate for signal distortions attributable to ISI, reflection and other effects that can be expected to limit bandwidth in the second data channel 386. A preconditioned data signal 366 output by the FFE 356 is provided to a driver circuit 358 that is configured generate and transmit a differential transmit data signal 368 over the second data channel 386.

The illustrated modem 300 can be configured to process a data signal 332 received over the second data channel 386. The data signal 332 may be provided to a differential receiver 320, which may include or cooperate with an equalizing circuit. In one example, CTLE may be used to compensate for certain losses experienced in the second data channel 386. The second data channel 386 may be characterized in some respects as a low-pass filter. In the illustrated example, the differential receiver 320 outputs an equalized data signal 328 that is sampled by a slicer 318. The slicer 318 may be implemented using a D-flipflop or the like and may be configured to capture signaling state of the equalized data signal 328 under the control of edges in a sampling clock signal 334 generated by a CDR circuit 314. The output of the slicer 318 may be provided to a deserializer 316 that is clocked in accordance with one or more clock signals provided by the CDR circuit 314. The CDR circuit 314 may be configured to delay or phase shift a transmitter clock signal to ensure that edges in the sampling clock signal 334 are timed to optimize sampling reliability.

A clock generation circuit, including the illustrated phase locked loop 308, may generate multiple clock signals 336a, 336b, 336c used by the modem 300. One or more of the clock signals 336a, 336b, 336c may be a divided version of a base clock signal generated by the PLL 308. One or more of the clock signals 336a, 336b, 336c may be phase shifted with respect to the base clock signal. In one example, the serializer 302 may produce the serialized data signal 322 using timing provided by a first clock signal 336a. In another example, the bus clock signal 330 transmitted over the clock channel 384 may be derived from a second clock signal 336b. In some instances, a duty cycle correction circuit 310 may be used to adjust the duty cycle of the second clock signal 336b and to provide an input to a driver circuit 312 that is configured drive the clock channel 384. In another example, the CDR circuit 348 may generate the sampling clock signal 334 from a third clock signal 336c.

Limiting power consumption presents a major challenge in communication interfaces, including communication interfaces that include a SERDES. In mobile communication devices, reducing power consumption can increase battery life between charges. Accordingly, power consumption is a parameter that must be considered when physical layer (PHY) circuits are designed for communication interfaces that are required to meet ever-increasing demands for data rates and corresponding signaling rates associated with the communication interface. Demands for higher data rates and increased performance from SERDES-based PHY circuits are a consequence of continual advances in process technology and changing industry and proprietary standards. Moreover, PHY circuits are typically required to maintain backward compatibility to all previous generations of technology while supporting the higher data rates required by ever-evolving standards, necessitating increased numbers of transistors. The switching frequency of PHY circuits in communication interfaces can be a major factor in power consumption of an apparatus. For example, the operating frequencies of clock generation circuits for SERDES-based PHY circuits are determinative of maximum data rates for an application and power consumption increases as operating frequencies increase.

Figure 4:
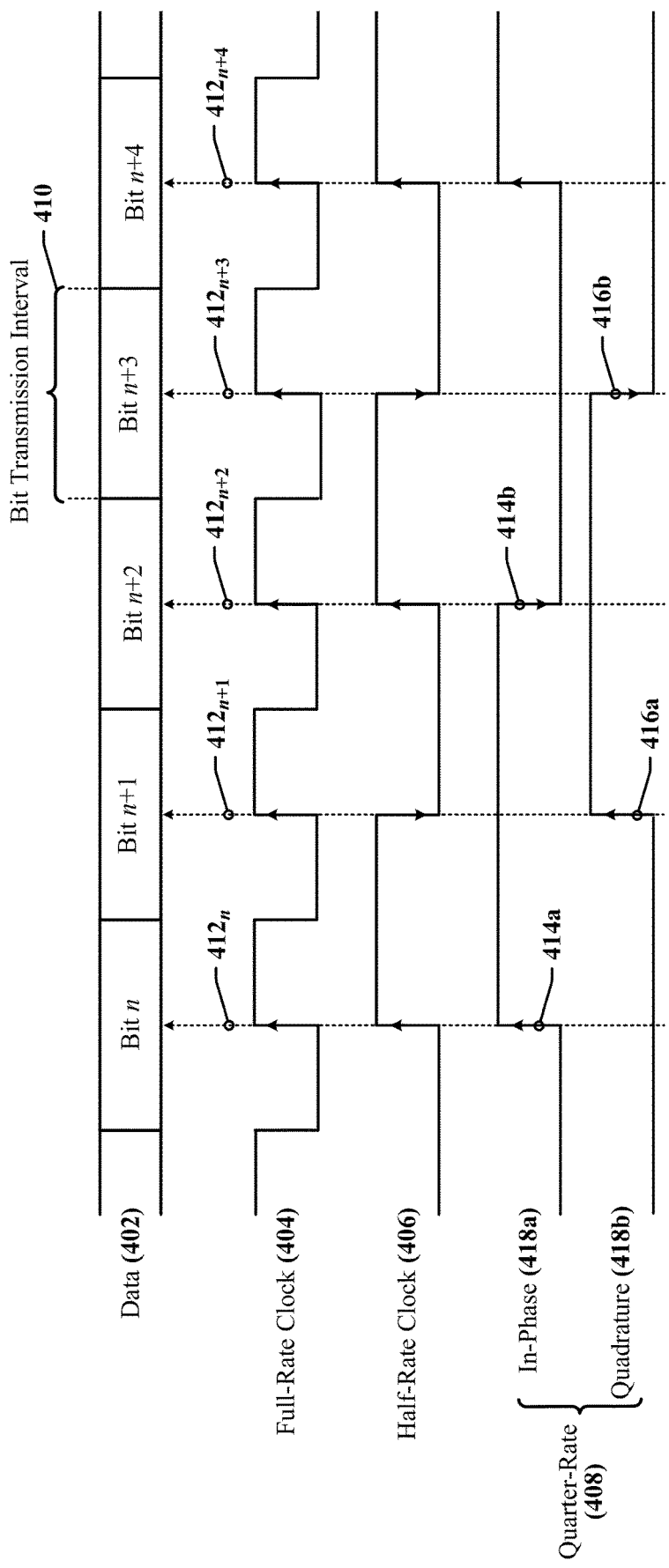
FIG. 4 illustrates an example of timing associated with a receiver that may be adapted or configured in accordance with certain aspects of this disclosure.

Power consumption can be reduced when certain SERDES circuits are operated in accordance with clock signals that have a frequency that is lower than the frequency of the data signal transmitted over a communication link. FIG. 4 illustrates an example of timing 400 associated with a receiver that may be adapted or configured in accordance with certain aspects of this disclosure. The illustrated timing 400 relates to a data signal 402 that is received over a communication link. Data bits are transmitted in bit transmission intervals 410 that have a duration defined by the frequency of the data signal 402. The frequency of the data signal defines the bit transmission rate defined for a single wire or channel of the communication link.

Certain SERDES circuits may be operated or controlled by a full-rate clock signal 404. The full-rate clock signal 404 has a period that matches the duration of each bit transmission interval 410 (i.e., the duration of transmission of each of Bit n-Bit n+4). A SERDES circuit that operates at full rate is required to meet certain timing requirements defined for the data signal 402. In one example, a single bit of data is shifted out of a full-rate serializer in every cycle of the full-rate clock signal 404. In another example, a receiver may be configured to sample or capture data using one edge of a full-rate clock signal. In the illustrated example, data bits may be captured using rising edges of the full-rate clock signal 404. In some instances, the full-rate clock signal 404 is phase shifted with respect to the data signal 402 to provide rising edges in the full-rate clock signal 404 at desired sampling points $412_n$-$412_{n+4}$. In the illustrated example, rising edges of the full-rate clock signal 404 are timed to occur at the midpoint of each bit transmission interval 410. In other examples, the falling edges of the full-rate clock signal 404 may be used to capture data bits. In some implementations, data bits are captured toward the end of each bit transmission interval 410.

Certain SERDES circuits may be operated or controlled by a half-rate clock signal 406. The term half-rate as used herein refers to the use of a clock signal with a frequency that is half the frequency of the data signal 402. In the illustrated example, both rising and falling edges in the half-rate clock signal 406 are used to capture bits of data from different bit transmission intervals 410. The half-rate clock signal 406 has a period that is twice the duration of each bit transmission interval 410, and a data bit may be captured during each half-cycle of the half-rate clock signal 406. In the illustrated example, the rising edges and falling edges of the half-rate clock signal 406 are timed to occur at the midpoint of each bit transmission interval 410. In other examples, data bits may be captured toward the end of each bit transmission interval 410. A half-rate transmitter may include a serializer with two transmission paths that alternate in providing bits for transmission. The serializer may include one or more multiplexers, one or more shift registers, or some combination of multiplexers and shift registers. The circuits in the two transmission paths in a half-rate serializer may be clocked by different edges in the half-rate clock signal 406 and a multiplexer operating at the full-rate frequency may be used to select between outputs of the two transmission paths to provide a serial bitstream for transmission over a communication link. A half-rate receiver typically includes two receiver paths that alternate in sampling or capturing bits from the data signal 402. In one example, circuits in the half-rate receiver may include shift registers that respond to different edges in the half-rate clock signal 406.

Certain SERDES circuits may be operated or controlled by a quarter-rate clock 408. The term quarter-rate as used herein refers to the use of a multiphase clock signal with a frequency that is a quarter of the frequency of the data signal 402. The quarter-rate clock 408 includes an in-phase signal 418b and a quadrature signal. The quadrature signal 418b is phase-shifted with respect to the in-phase signal 418a by 90°. Four consecutively transmitted data bits can be captured from different bit transmission intervals 410 in the data signal 402 using rising edges 414a in the in-phase signal 418a, rising edges 416a in the quadrature signal 418b, falling edges 414b in the in-phase signal 418a and falling edges 416b in the quadrature signal 418b. The quarter-rate clock 408 has a period that corresponds to four times the duration of each bit transmission interval 410, and a data bit is captured during each quarter-cycle of the quarter-rate clock 408. In the illustrated example, rising edges 414a, 416a and falling edges 414b, 416b are timed to occur at the midpoint of each bit transmission interval 410. In other examples, data bits may be captured toward the end of each bit transmission interval 410.

A quarter-rate transmitter may include a serializer with four transmission paths that alternate in providing bits for transmission. The serializer may include one or more multiplexers, one or more shift registers, or some combination of multiplexers and shift registers. The circuits in the four transmission paths in a quarter-rate serializer may be clocked by different edges provided by the in-phase signal 418a and the quadrature clock signals 418b. In one example, a multiplexer operating at the full-rate frequency may be used to select among the outputs of the four transmission paths to provide a serial bitstream for transmission over a communication link. A quarter-rate receiver may include four receiver paths that are configured to sample or capture bits from the data signal 402. In one example, circuits in the quarter-rate receiver may include shift registers or multiplexers that respond to different edges in the in-phase signal 418a and the quadrature clock signals 418b.

The generation of multiphase signals, such as the quarter-rate clock 408, requires precise quadrature clock generation to produce the 4 phases of a clock signal. In many conventional systems, phase relationships between in-phase and quadrature signals can change due to process, voltage or temperature (PVT) variations.

Figure 5:
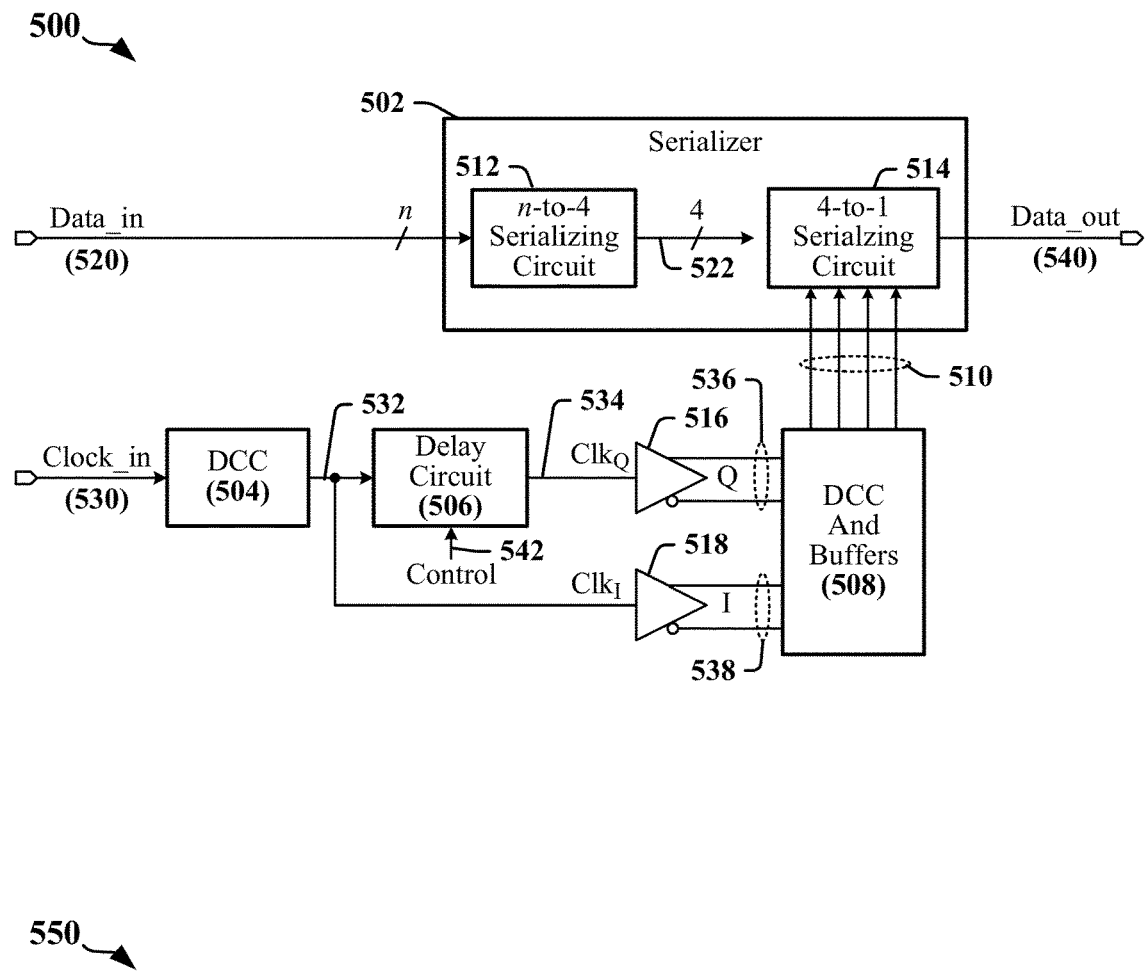
FIG. 5 illustrates an example of a conventional quarter-rate transmitter.
Figure 5:
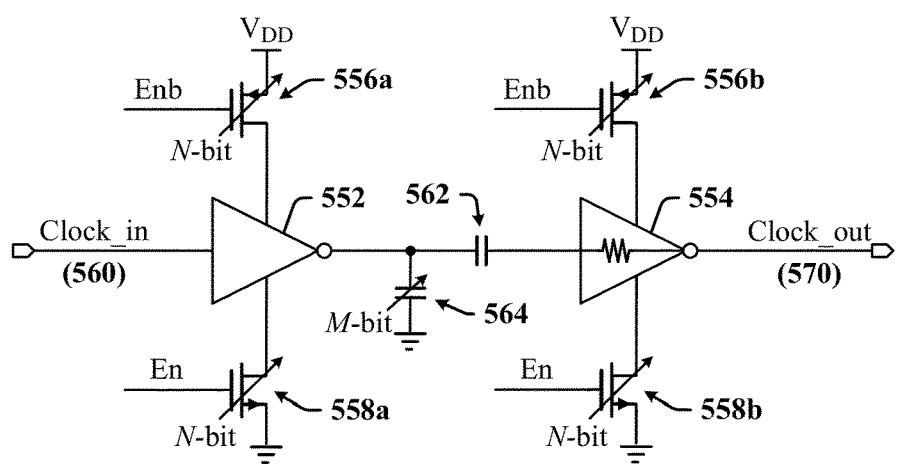

FIG. 5 illustrates an example of a conventional quarter-rate transmitter 500. The quarter-rate transmitter 500 includes a serializer 502 that responds to edges provided in a multiphase clock signal 510 to provide a data output signal 540 that includes a serial bitstream. The serial bitstream is obtained by serializing a multibit data input 520. In the illustrated example, the multibit data input 520 is provided to a first serializing circuit 512 that receives a quantity (n) of bits and provides a 4-bit datastream 522 that includes a sequence of 4-bit units of data. In some implementations, the 4-bit datastream 522 may be generated using one or more multiplexers, one or more shift registers, or some combination of multiplexers and shift registers. In some implementations, the 4-bit datastream 522 may be received from registers written by a processor. The 4-bit datastream 522 is provided to a second serializing circuit 514 that provides a serial output data signal 540 according to timing provided by edges in the multiphase clock signal 510.

The multiphase clock signal 510 is derived from a quarter-rate input clock signal 530. In the illustrated example, the quarter-rate input clock signal 530 is provided to a duty cycle correction (DCC) circuit 504 that can be configured to ensure that the duration between rising edges and subsequent falling edges in a corrected clock signal 532 is substantially the same (i.e., within predefined tolerances) as the duration between falling edges and subsequent rising edges in the corrected clock signal 532. In some implementations, a divider circuit that provides the quarter-rate input clock signal 530 may be configured to ensure that the duty cycle of the quarter-rate input clock signal 530 lies within tolerances defined for the quarter-rate transmitter 500.

The corrected clock signal 532 may be provided to a buffer circuit 518 that outputs a differential in-phase clock signal 538. The corrected input clock signal 532 is further provided to a delay circuit 506 that outputs a delayed clock signal 534. The delay circuit 506 can be configured by a control signal 542 to delay the corrected input clock signal 532 by a duration the corresponds to 25% of the period of the quarter-rate input clock signal 530 in order to cause the delayed clock signal 532 to be phase-shifted by 90° with respect to the corrected input clock signal 532. The delayed clock signal 532 may be provided to a buffer circuit 516 that outputs a differential quadrature clock signal 536. In one example, the delay duration provided by the delay circuit 506 may be selected or adjusted using a coded value provided by the control signal 542. In another example, the control signal 542 may provide feedback that adjusts the delay duration provided by the delay circuit 506.

The differential in-phase clock signal 538 (I) and the differential quadrature clock signal 536 (Q) may be provided to conditioning circuits 508. The conditioning circuits 508 may include clock distribution drivers, buffers, additional DCC circuits and the like. The conditioning circuits 508 output the multiphase clock signal 510.

FIG. 5 also illustrates an example of a delay cell 550 that may be used in the delay circuit 506. The delay circuit 506 may include a delay line that includes multiple sequentially-coupled instances of the delay cell 550. The delay cell 550 includes inverters 552 and 554 coupled by a capacitor 562. Certain output switching characteristics of the inverters 552, 554 may be configured, or controlled by adjusting the current supplied to the inverters 552, 554. In the illustrated example, current supplies to the inverters 552, 554 are controlled using PMOS transistors 556a, 556b that couple respective inverters 552, 554 to the higher voltage power supply rail ($V_{DD}$) and NMOS transistors 558a, 558b that couple respective inverters 552, 554 to the lower voltage power supply rail (Ground). Current flow can be controlled by increasing the number of transistors 556a, 556b, 558a, 558b that actively couple an inverter 552 or 554 to a power supply rail. In the illustrated example, the number of activated PMOS transistors 556a, 556b and activated NMOS transistors 558a, 558b is determined by an N-bit control code.

An input signal 560 may be delayed by a first duration that is determined in part by the current levels provided to the inverters 552, 554. The delay applied to the input signal 560 may be controlled by adjusting the configuration of the transistors 556a, 556b, 558a, 558b. The input signal 560 may be further delayed by a second duration that is determined by an RC constant associated with the coupling between the inverters 552 and 554. In the illustrated example, a variable capacitance 564 couples the output of a first inverter 552 to ground, and the combination of the variable capacitance 564 with internal resistance of the second inverter 554 provides a configurable RC constant. The variable capacitance 564 may be controlled by selectively coupling some number of capacitors in parallel using switches controlled by an M-bit control code, for example.

In conventional systems, the delay duration provided by the delay cell 550 is sensitive to variation of power supply voltage ($V_{DD}$-Ground) and can drift when the voltages or relative voltage of the power supply rails change. The delay duration provided by the delay cell 550 is also sensitive to noise that can create timing jitter at the output clock signal 570.

Certain aspects of this disclosure relate to delay cells that are insensitive to variations in power supply voltages and/or that exhibit good power supply rejection (PSR). PSR may be used to characterize the ability of a circuit to reject noise introduced by a power supply. Power supply voltage insensitivity and the ability to reject noise introduced by a power supply enable the presently-disclosed delay cells to maintain the calibrated or configured phase relationship between input clock signals and output clock signals of the delay cells.

In one aspect, a delay cell configured or constructed in accordance with certain aspects of this disclosure can generate a quadrature clock signal using circuits based on resistor-capacitor (RC) networks and complementary metal-oxide-semiconductor (CMOS) digital circuits, simplifying design and lowering power consumption. A delay cell configured or constructed in accordance with certain aspects of this disclosure can achieve substantial reductions in power consumption and can reduce voltage sensitivity. In one example, power consumption by a delay cell configured or constructed in accordance with certain aspects of this disclosure may be reduced by 75% or more with respect to conventional delay cells. In another example, a delay cell configured or constructed in accordance with certain aspects of this disclosure and can reduce voltage sensitivity by a factor of 2 or more with respect to conventional delay cells.

Certain aspects of this disclosure relate to clock generation circuits that can support a wide range of data rates while maintaining low design complexity and low power consumption. In one example, a clock generation circuit disclosed herein can operate at low power while delivering high quality clock signals to a transceiver (i.e., a transmitter/receiver combination circuit). In some instances, a clock generation circuit provided in accordance with certain aspects of this disclosure may process input clock signals provided by a PLL and can operate at low power while delivering high quality clock signals over a wide range of data rates. Certain circuits disclosed herein can be scaled with process variations. A clock generation circuit provided in accordance with certain aspects of this disclosure can generate robust clock signals with precise phase relationships. A clock generation circuit provided in accordance with certain aspects of this disclosure can be used with a variety of communication interface and SERDES architectures, and can support multiple data rates required by certain SERDES-based PHY applications.

Figure 6:
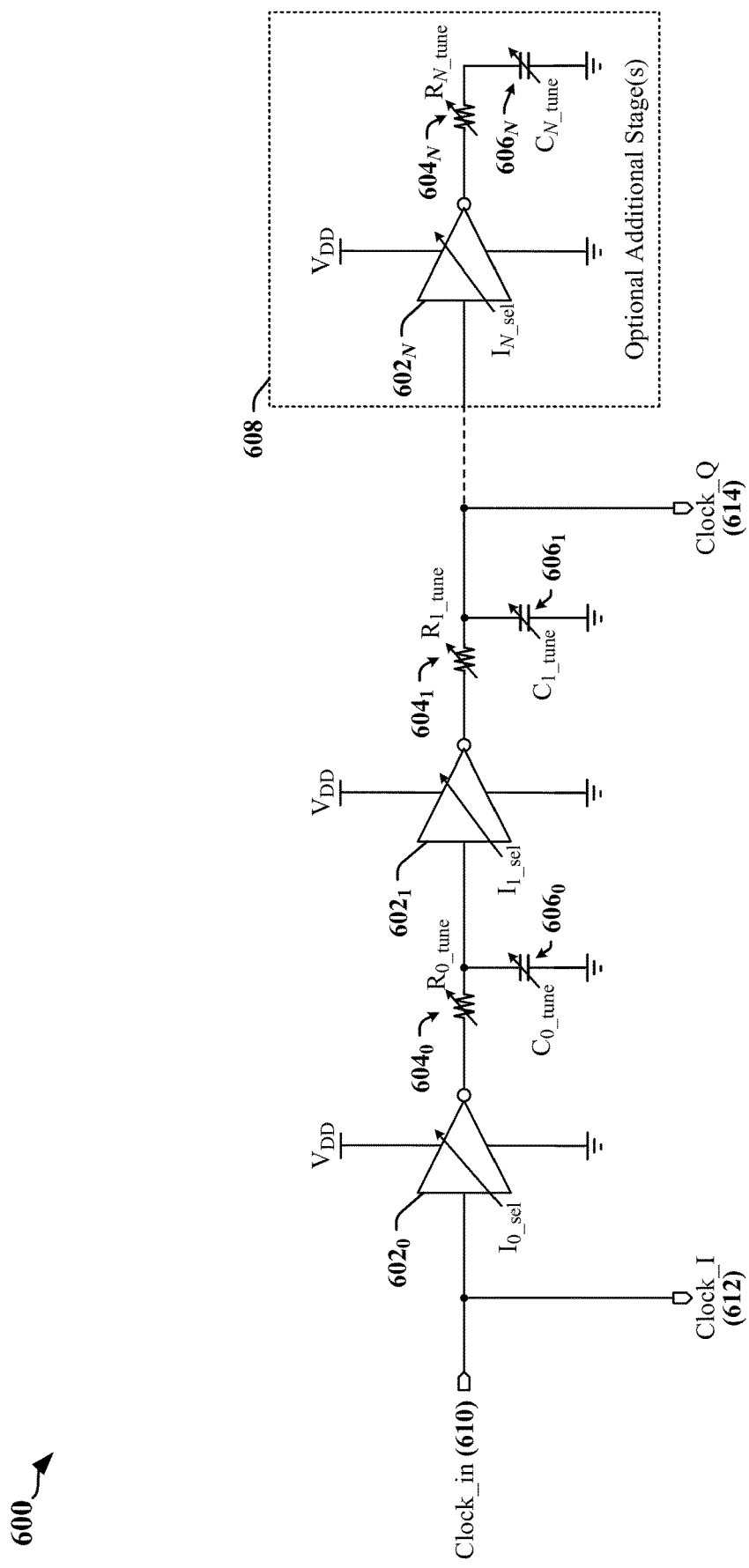
FIG. 6 illustrates an example of a delay cell provided in accordance with certain aspects of this disclosure.

FIG. 6 illustrates an example of a delay cell 600 provided in accordance with certain aspects of this disclosure. The delay cell 600 includes configurable inverters $602_0$-$602_N$ that are coupled in series by tunable resistors $604_0$-$604_N$. In one example, each of the inverters $602_0$-$602_N$ includes a selectable number of inverter subcircuits that can be activated and coupled in parallel to provide a desired drive capability for the inverter $602_0$-$602_N$. The number of inverter subcircuits activated for each inverter $602_0$-$602_N$ may be controlled or selected by a multibit code ($I_{0\_sel}$-$I_{N\_sel}$). Values may be assigned to each multibit code during configuration, calibration and/or in response to changes detected during operation. The inverters $602_0$-$602_N$ can be scaled with respect to the resistance selected for their respective resistors $604_0$-$604_N$ such that the delay provided by the delay cell 600 is dominated by resistance.

The delay provided by the delay cell 600 is provided primarily by the passive components of RC circuits that include the resistors $604_0$-$604_N$ and corresponding tunable capacitors $606_0$-$606_N$. In certain implementations, resistance values for the resistors $604_0$-$604_N$ can be selected using a multibit code ($R_{0\_tune}$-$R_{N\_tune}$). In one example, each resistor $604_0$-$604_N$ can be configured by coupling a programmable number of resistors in parallel using switches responsive to the corresponding $R_{0\_tune}$-$R_{N\_tune}$ multibit code. In another example, each resistor $604_0$-$604_N$ can be configured by coupling a programmable number of resistors in series using switches responsive to the corresponding $R_{0\_tune}$-$R_{N\_tune}$ multibit code. In certain implementations, capacitance values for the capacitors $606_0$-$606_N$ can be selected using a multibit code ($C_{0\_tune}$-$C_{N\_tune}$). In one example, each capacitor $606_0$-$606_N$ can be configured by coupling a programmable number of capacitors in parallel using switches responsive to the corresponding $R_{0\_tune}$-$R_{N\_tune}$ multibit code. The resultant resistor and capacitor arrays can be configured during foreground calibration that may be performed to accommodate or counteract process variations.

The delay cell 600 may configure multiple stages to obtain the 90° phase shift needed to derive a quadrature clock signal 614 from an in-phase clock signal 612 provided as the input clock signal 610 to the delay cell 600. The two stages in the illustrated delay cell 600 include inverters $602_0$ and $602_1$, and each stage may be expected to produce a delay that corresponds to 12.5% of the period of the input clock signal 610 for a total delay that corresponds to 25% of the period of the input clock signal. In some instances, performance degradation may occur due to decreasing voltage swing as the RC constant increases, and one or more additional stages may be added to the delay line within the delay cell 600.

Figure 7:
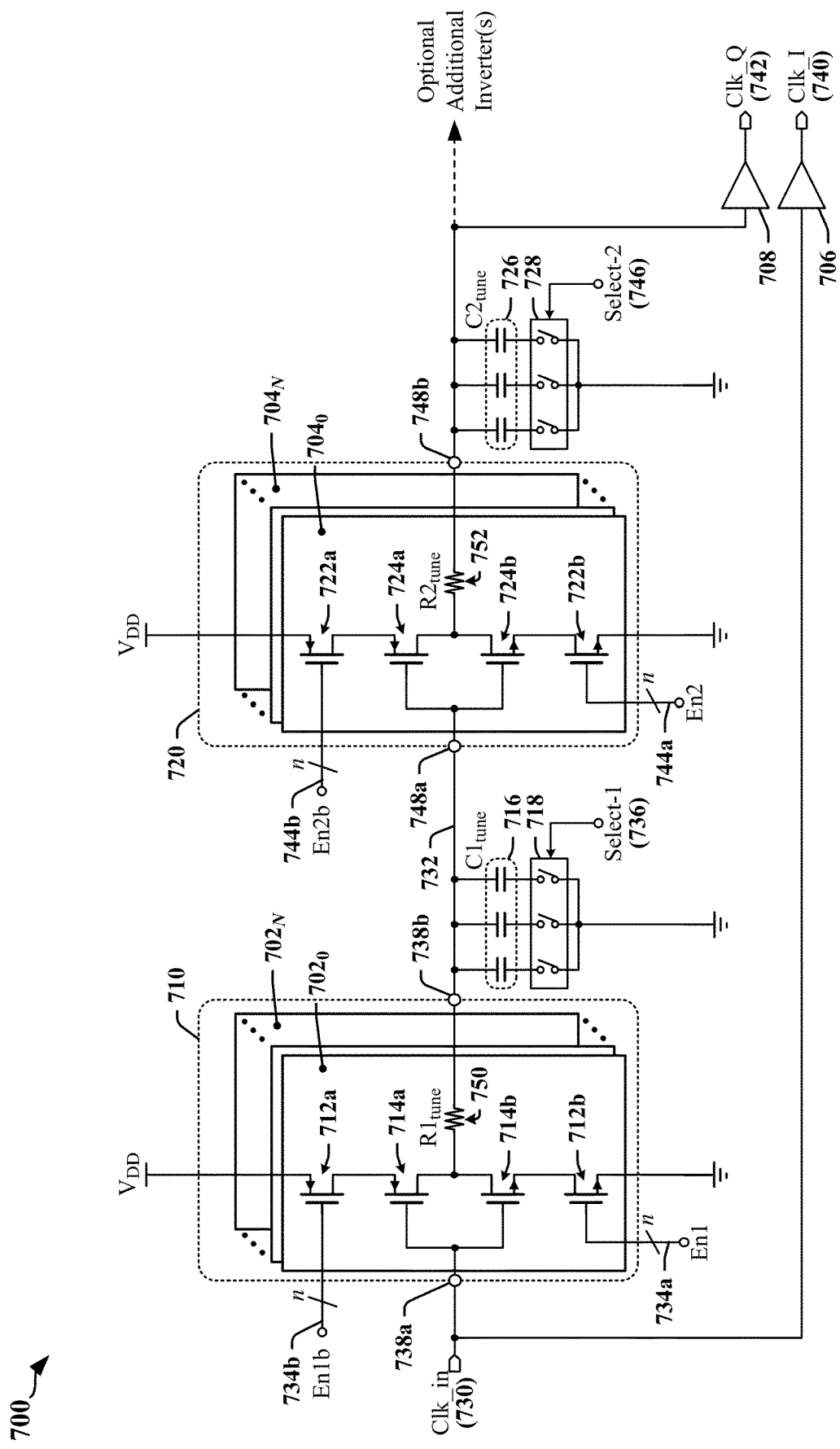
FIG. 7 illustrates an example of an implementation of a delay cell according to certain aspects of this disclosure.

FIG. 7 illustrates an example of an implementation of a delay cell 700 according to certain aspects of this disclosure. The delay cell 700 includes two serially-coupled inverters 710, 720. The first inverter 710 includes multiple circuits which may be referred to as subcircuits, segments and which are referred to herein as slices $702_0$-$702_N$. The slices $702_0$-$702_N$ are coupled in parallel between two nodes that, in the illustrated example, correspond to an input 738a and an output 738b of the first inverter 710. The slices $702_0$-$702_N$ may be selectively enabled. An n-bit differential enable signal (En1 734a and En1b 734b) may be used to select one or more of the slices $702_0$-$702_N$ for activation. In one example, each slice $702_0$-$702_N$ is enabled or activated based on signaling state of one bit of the differential enable signal. In the illustrated example, an NMOS transistor 712b in a first slice $702_0$ of the first inverter 710 is turned on when a corresponding bit of En1 734a is in a first signaling state and turned off when the corresponding bit of En1 734a is in a second signaling state. In this example, a PMOS transistor 712a in the first slice $702_0$ is turned on when a corresponding bit of En1b 734b is in the second signaling state and turned off when the corresponding bit of En1b 734b is in the first signaling state. Driver transistors 714a, 714b are coupled in series between the rails of the power supply and are active when transistors 712a, 712b are turned on. A clock input signal 730 is coupled to the gates of the driver transistors 714a, 714b and the drains of the driver transistors 714a, 714b are coupled to the output 738b of the first inverter 710. The PMOS transistor 714a is coupled to the higher voltage rail ($V_{DD}$) of the power supply when transistor 712a is turned on and the NMOS transistor 714b is coupled to the lower voltage rail (Ground) of the power supply when transistor 712b is turned on.

The drains of the driver transistors 714a, 714b are coupled to the output 738b of the first inverter 710 through a tuning resistor 750. In some implementations, the resistance value provided by the tuning resistor 750 can be adjusted, calibrated or configured. In some implementations, the resistance component of an RC network can be modified by turning on one or more slices $702_0$-$702_N$, thereby adding one or more tuning resistors in parallel to the RC network. Each added tuning resistor is driven by its associated slice $702_0$-$702_N$. In the illustrated example, the RC network includes one or more tuning resistors 750 and a capacitor network 716 that provides variable capacitance. Individual capacitors in the capacitor network 716 can be selectively coupled between the output 738b of the first inverter 710 and the Ground rail of the power supply using switches 718 controlled by a first capacitance select code 736. The first capacitance select code 736 may be a multibit signal and may be configured during system initialization, calibration and/or by command of a controller in the communication interface.

The second inverter 720 includes multiple subcircuits, segments or slices $704_0$-$704_N$. The slices $704_0$-$704_N$ are coupled in parallel between two nodes that, in the illustrated example, correspond to an input 748a and an output 748b of the second inverter 720. The slices $704_0$-$704_N$ may be selectively enabled. An n-bit differential enable signal (En2 744a and En2b 744b) may be used to select one or more of the slices $704_0$-$704_N$ for activation. In one example, each slice $704_0$-$704_N$ is enabled or activated based on signaling state of one bit of the differential enable signal. In the illustrated example, an NMOS transistor 722b in a first slice $704_0$ of the second inverter 720 is turned on when a corresponding bit of En2 744a is in the first signaling state and turned off when the corresponding bit of En2 744a is in the second signaling state. In this example, a PMOS transistor 722a in the first slice $704_0$ is turned on when a corresponding bit of En2b 744b is in the second signaling state and turned off when the corresponding bit of En2b 744b is in the first signaling state. In the current example, the first inverter 710 and the second inverter 720 have the same number of slices (N+1). However, it should be apparent to one of skill in the art that other implementations can include inverters having different numbers of slices. Driver transistors 724a, 724b are coupled in series between the rails of the power supply and are active when transistors 722a, 722b are turned on. An input signal 732 received through the input 748a of the second inverter 720 is coupled to the gates of the driver transistors 724a, 724b. The drains of the driver transistors 724a, 724b are coupled to the output 748b of the second inverter 720. Driver transistor 724a is a PMOS transistor that is coupled to the higher voltage rail ($V_{DD}$) of the power supply when transistor 722a is turned on and driver transistor 724b is an NMOS transistor coupled to the lower voltage rail (Ground) of the power supply when transistor 722b is turned on.

The drains of the driver transistors 724a, 724b are coupled to the output 748b of the second inverter 720 through a tuning resistor 752. In some implementations, the resistance value provided by the tuning resistor 752 can be adjusted, calibrated or configured. In some implementations, the resistance component of an RC network can be modified by turning on one or more slices $704_0$-$704_N$, thereby adding one or more tuning resistors in parallel to the RC network. Each added tuning resistor is driven by its associated slice $704_0$-$704_N$. In the illustrated example, the RC network includes one or more tuning resistors 752 and a capacitor network 726 that provides variable capacitance. Individual capacitors in the capacitor network 726 can be selectively coupled between the output 748b of the second inverter 720 and the Ground rail of the power supply using switches 728 controlled by a second capacitance select code 746. The second capacitance select code 746 may be a multibit signal and may be configured during system initialization, calibration and/or by command of a controller in the communication interface.

In the illustrated example, the clock input signal 730 is coupled to a buffer 706 that drives the in-phase output 740 of the delay cell 700 and the output 748b of the second inverter 720 is coupled to a buffer 708 that drives the quadrature output 742 of the delay cell 700. In other examples, the delay cell 700 may buffer only one or neither of the in-phase output 740 and quadrature output 742. In some implementations, the quadrature output 742 of the delay cell 700 is provided by a third, additional inverter (not shown) that is coupled to the output 748b of the second inverter 720.

Figure 8:
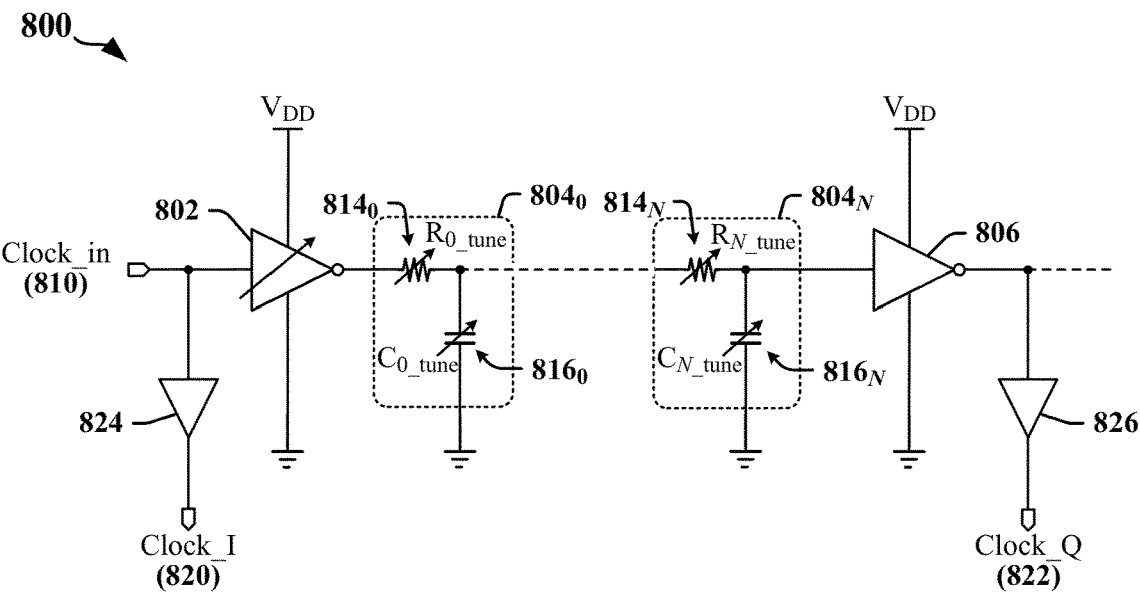
FIG. 8 illustrates additional examples of delay cells that include cascaded resistance-capacitance networks in accordance with certain aspects of this disclosure.
Figure 8:
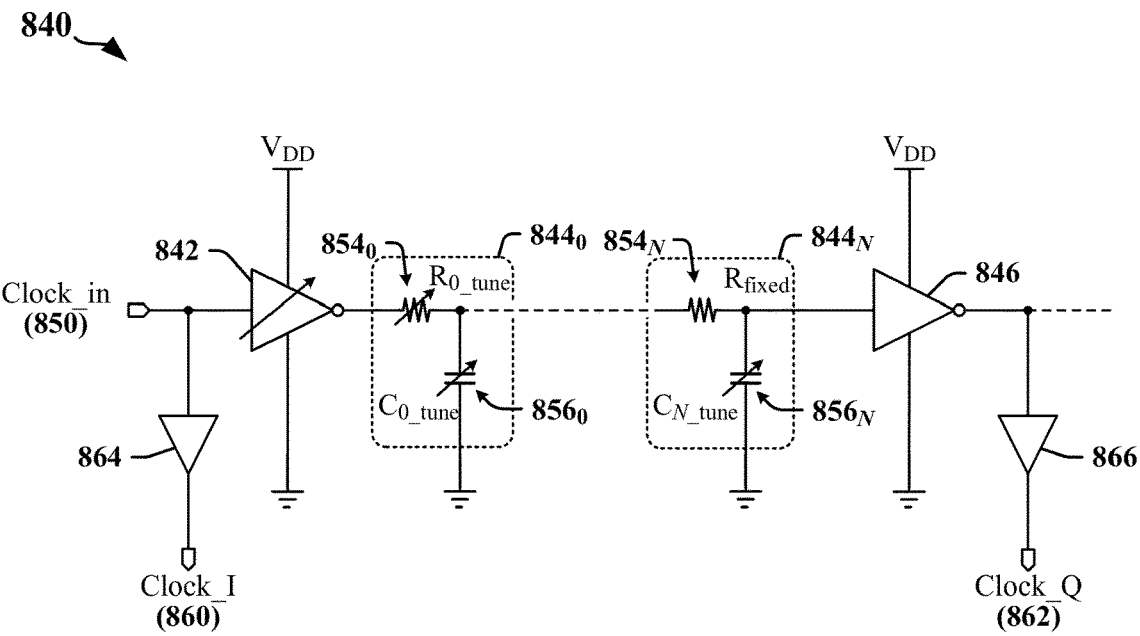

FIG. 8 illustrates additional examples of delay cells 800, 840 provided in accordance with certain aspects of this disclosure. Each of these delay cells 800, 840 uses higher order RC networks to provide a configurable delay duration.

The first delay cell 800 includes inverters 802, 806 that are coupled in series through cascaded RC networks $804_0$-$804_N$. In the illustrated example, a configurable inverter 802 receives an input clock signal 810 and is coupled to a second inverter 806 through at least two tunable RC networks $804_0$ and $804_N$. The input clock signal 810 may provide the in-phase output 820 of the first delay cell 800 and the output of the second inverter 806 can provide the quadrature output 822 of the first delay cell 800. In the illustrated example, the in-phase output 820 and the quadrature output 822 are driven by buffers 824, 826. In other examples, the first delay cell 800 may buffer only one or neither of the in-phase output 820 and/or quadrature output 822.

The configurable inverter 802 includes a selectable number of inverter subcircuits, segments or slices that can be activated and coupled in parallel to provide a desired drive capability for the configurable inverter 802. The number of inverter subcircuits, segments or slices activated may be controlled or selected by a multibit code. Values may be assigned to each multibit code during configuration, calibration and/or in response to changes detected during operation. The configurable inverter 802 can be scaled based on the resistance values selected for the resistors $814_0$-$814_N$ such that the delay provided by the first delay cell 800 is dominated by resistor value. The delay provided by the first delay cell 800 is provided primarily by the passive components of the cascaded RC networks $804_0$-$804_N$.

The first RC network $804_0$ in the first delay cell 800 includes a tunable resistor $814_0$ and a tunable capacitor $816_0$. In certain implementations, resistance values for the resistor $814_0$ can be selected using a multibit code ($R_{0\_tune}$). In one example, resistor $814_0$ can be configured by coupling a programmable number of resistors in parallel using switches responsive to the corresponding $R_{0\_tune}$ multibit code. In another example, resistor $814_0$ can be configured by coupling a programmable number of resistors in series using switches responsive to the corresponding $R_{0\_tune}$ multibit code. In certain implementations, capacitance values for capacitor $816_0$ can be selected using a multibit code ($C_{0\_tune}$). In one example, capacitor $816_0$ can be configured by coupling a programmable number of capacitors in parallel using switches responsive to the corresponding $C_{0\_tune}$ multibit code.

The second RC network $804_N$ in the first delay cell 800 includes a tunable resistor $814_N$ and a tunable capacitor $816_N$. In certain implementations, resistance values for the resistor $814_N$ can be selected using a multibit code ($R_{N\_tune}$). In one example, resistor 814 can be configured by coupling a programmable number of resistors in parallel using switches responsive to the corresponding $R_{N\_tune}$ multibit code. In another example, resistor $814_N$ can be configured by coupling a programmable number of resistors in series using switches responsive to the corresponding $R_{N\_tune}$ multibit code. In certain implementations, capacitance values for capacitor $816_N$ can be selected using a multibit code ($C_{N\_tune}$). In one example, capacitor $816_N$ can be configured by coupling a programmable number of capacitors in parallel using switches responsive to the corresponding $C_{N\_tune}$ multibit code.

In some implementations, one or more additional RC Networks (not shown) may be used to couple the first RC network $804_0$ to the second RC network $804_N$. The RC networks $804_0$-$804_N$ can be configured during foreground calibration. Foreground calibration may be performed to accommodate or counteract process variations.

In some implementations, the first delay cell 800 includes additional inverters and associated RC Networks as needed to obtain the 90° phase shift, or any desired phase shift. The in-phase output 820 may be derived from the input clock signal 810 and the first delay cell 800 may be configured to generate the quadrature output 822 by delaying the input clock signal 810. The two inverters 802 and 806 and the RC Networks $804_0$, $804_N$ may be expected to produce a delay that corresponds to 25% of the period of the input clock signal.

The second delay cell 840 includes inverters 842, 846 that are coupled in series through cascaded RC networks $844_0$-$844_N$. In the illustrated example, a configurable inverter 842 receives an input clock signal 850 and is coupled to a second inverter 846 through at least two tunable RC networks $844_0$ and $844_N$. The input clock signal 850 may be provided as the in-phase output 860 of the second delay cell 840 and the output of the second inverter 846 provides the quadrature output 862 of the second delay cell 840. In the illustrated example, the in-phase output 860 and the quadrature output 862 are driven by buffers 864, 866. In other examples, the second delay cell 840 may buffer only one or neither of the in-phase output 860 and/or quadrature output 862.

The configurable inverter 842 includes a selectable number of inverter subcircuits, segments or slices that can be activated and coupled in parallel to provide a desired drive capability for the configurable inverter 842. The number of inverter subcircuits activated may be controlled or selected by a multibit code. Values may be assigned to each multibit code during configuration, calibration and/or in response to changes detected during operation. The configurable inverter 842 can be scaled based on the resistance values selected for the resistors $854_0$-$854_N$ such that the delay provided by the second delay cell 840 is dominated by resistor value. The delay provided by the second delay cell 840 is provided primarily by the passive components of the cascaded RC networks $844_0$-$844_N$.

The first RC network $844_0$ in the second delay cell 840 includes a tunable resistor $854_0$ and a tunable capacitor $856_0$. In certain implementations, resistance values for the resistor $854_0$ can be selected using a multibit code ($R_{0\_tune}$). In one example, resistor $854_0$ can be configured by coupling a programmable number of resistors in parallel using switches responsive to the corresponding $R_{0\_tune}$ multibit code. In another example, resistor $854_0$ can be configured by coupling a programmable number of resistors in series using switches responsive to the corresponding $R_{0\_tune}$ multibit code. In certain implementations, capacitance values for capacitor $856_0$ can be selected using a multibit code ($C_{0\_tune}$). In one example, capacitor $856_0$ can be configured by coupling a programmable number of capacitors in parallel using switches responsive to the corresponding $C_{0\_tune}$ multibit code.

The second RC network $844_N$ in the second delay cell 840 includes a fixed resistor $854_N$ and a tunable capacitor $856_N$. In some implementations, the resistor $854_0$ in the first RC network $844_0$ is tunable and the resistors in the other RC networks (including RC network $844_N$) have fixed values. In some implementations, only one resistor in each RC network RC networks $844_0$-$844_N$ is tunable. In certain implementations, capacitance values for capacitor $856_N$ can be selected using a multibit code ($C_{N\_tune}$). In one example, capacitor $856_N$ can be configured by coupling a programmable number of capacitors in parallel using switches responsive to the corresponding $C_{N\_tune}$ multibit code.

In some implementations, one or more additional RC Networks (not shown) may be used to couple the first RC network $844_0$ to the second RC network $844_N$. The RC networks $844_0$-$844_N$ can be configured during foreground calibration. Foreground calibration may be performed to accommodate or counteract process variations.

In one example, the two inverters 842 and 846 and the RC Networks $844_0$, $844_N$ may be expected to produce a delay that corresponds to 25% of the period of the input clock signal. In some implementations, the second delay cell 840 includes additional inverters and associated RC Networks as needed to obtain the 90° phase shift, or any desired phase shift.

Figure 9:
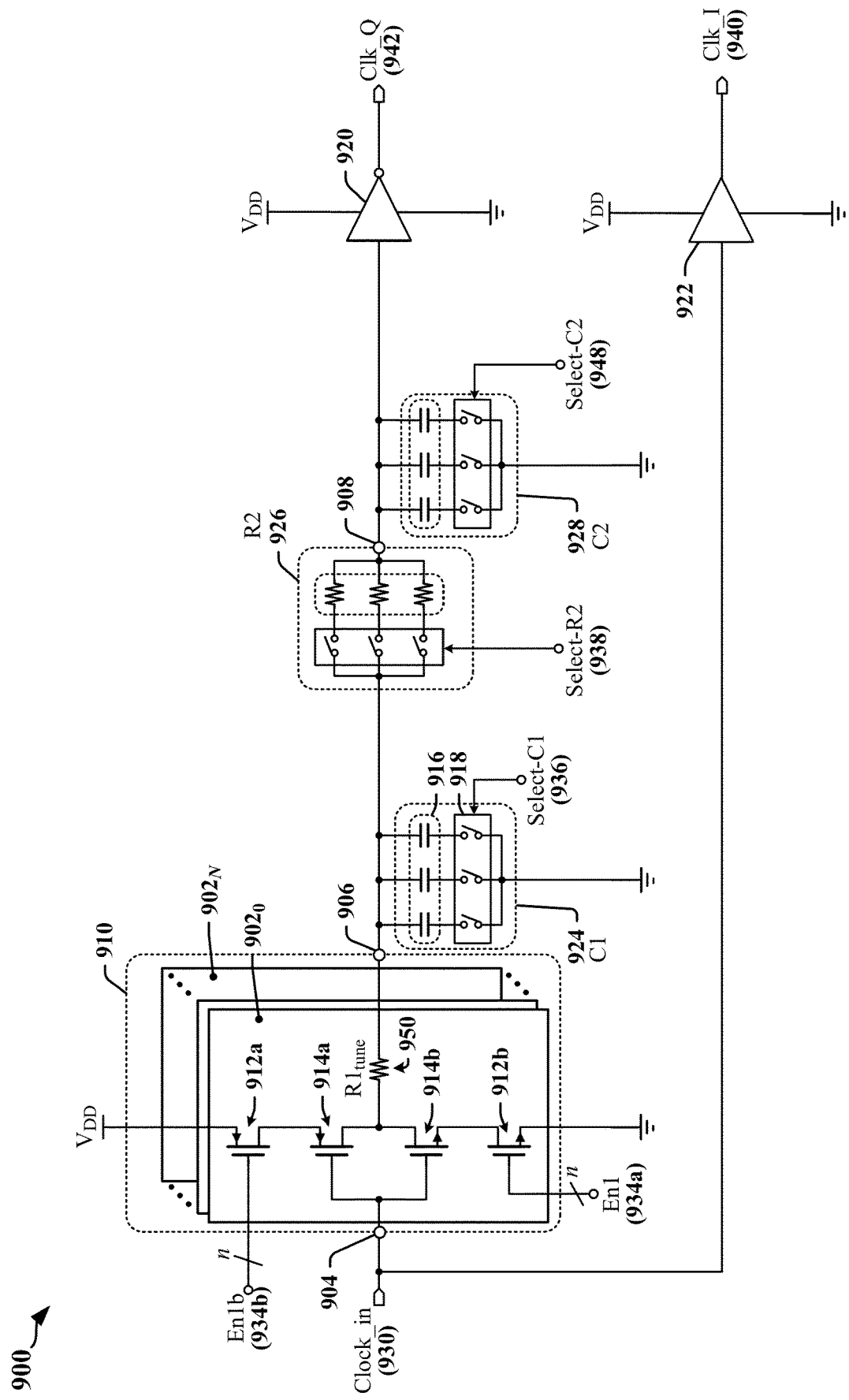
FIG. 9 illustrates an example of an implementation of a delay cell that includes cascaded resistance-capacitance networks in accordance with certain aspects of this disclosure.

FIG. 9 illustrates an example of an implementation of a delay cell 900 that includes cascaded RC networks in accordance with certain aspects of this disclosure. The delay cell 900 includes two serially-coupled inverters 910, 920. The first inverter 910 includes multiple circuits which are referred to herein as subcircuits, segments or slices $902_0$-$902_N$. The slices $902_0$-$902_N$ are coupled in parallel between two nodes that, in the illustrated example, correspond to an input 904 and an output 906 of the first inverter 910. The slices $902_0$-$902_N$ may be selectively enabled. An n-bit differential enable signal (En1 934a and En1b 934b) may be used to select one or more of the slices $902_0$-$902_N$ for activation. In one example, each slice $902_0$-$902_N$ is enabled or activated based on signaling state of one bit of the differential enable signal. In the illustrated example, an NMOS transistor 912b in a first slice $902_0$ of the first inverter 910 is turned on when a corresponding bit of En1 934a is in a first signaling state and turned off when the corresponding bit of En1 934a is in a second signaling state. In this example, a PMOS transistor 912a in the first slice $902_0$ is turned on when a corresponding bit of En1b 934b is in the second signaling state and turned off when the corresponding bit of En1b 934b is in the first signaling state. When transistors 912a, 912b are turned on, driver transistors 914a, 914b are coupled in series between the rails of the power supply and are active. A clock input signal 930 is coupled to the gates of the driver transistors 914a, 914b and the drains of the driver transistors 914a, 914b are coupled to the output 906 of the first inverter 910. The PMOS transistor 914a is coupled to the higher voltage rail ($V_{DD}$) of the power supply when transistor 912a is turned on and the NMOS transistor 914b is coupled to the lower voltage rail (Ground) of the power supply when transistor 912b is turned on.

The drains of the driver transistors 914a, 914b are coupled to the output 906 of the first inverter 910 through a tuning resistor 950. In some implementations, the resistance value provided by the tuning resistor 950 can be adjusted, calibrated or configured. In some implementations, the resistance component of a first RC network can be modified by turning on one or more slices $902_0$-$902_N$, thereby adding one or more tuning resistors in parallel to the first RC network. Each added tuning resistor is driven by its associated slice $902_0$-$902_N$. In the illustrated example, the first RC network includes one or more tuning resistors 950 and a tunable capacitor 924. The tunable capacitor 924 includes a capacitor network 916 in which individual capacitors can be selectively coupled between the output 906 of the first inverter 910 and the Ground rail of the power supply using switches 918 controlled by a control code 936. The control code 936 may be configured during system initialization, calibration and/or by command of a controller in the communication interface.

A second RC network is coupled in series with the first RC Network and can be configured with a desired resistance and a desired capacitance. The second RC network includes a tunable resistor 926 and a tunable capacitor 928. In certain implementations, resistance values for the resistor $814_N$ can be selected using a multibit code 938 to control switches configured to couple a selected number of resistors or selected resistors in parallel. The tunable capacitor 928 includes a capacitor network from which individual capacitors can be selectively coupled between the output 908 of the tunable resistor 926 and the Ground rail of the power supply using switches controlled by a control code 948. The control code 948 may be configured during system initialization, calibration and/or by command of a controller in the communication interface.

In the illustrated example, the output 908 of the tunable resistor 926 is coupled to the input of the second inverter 920. The clock input signal 930 is coupled to a buffer 922 that drives the in-phase output 940 of the delay cell 900 and the output 948*b* of the second inverter 920 drives the quadrature output 942 of the delay cell 900. In some examples, the delay cell 900 may buffer the output of the second inverter 920. In some examples, the clock input signal 930 may be used without buffering.

Figure 10:
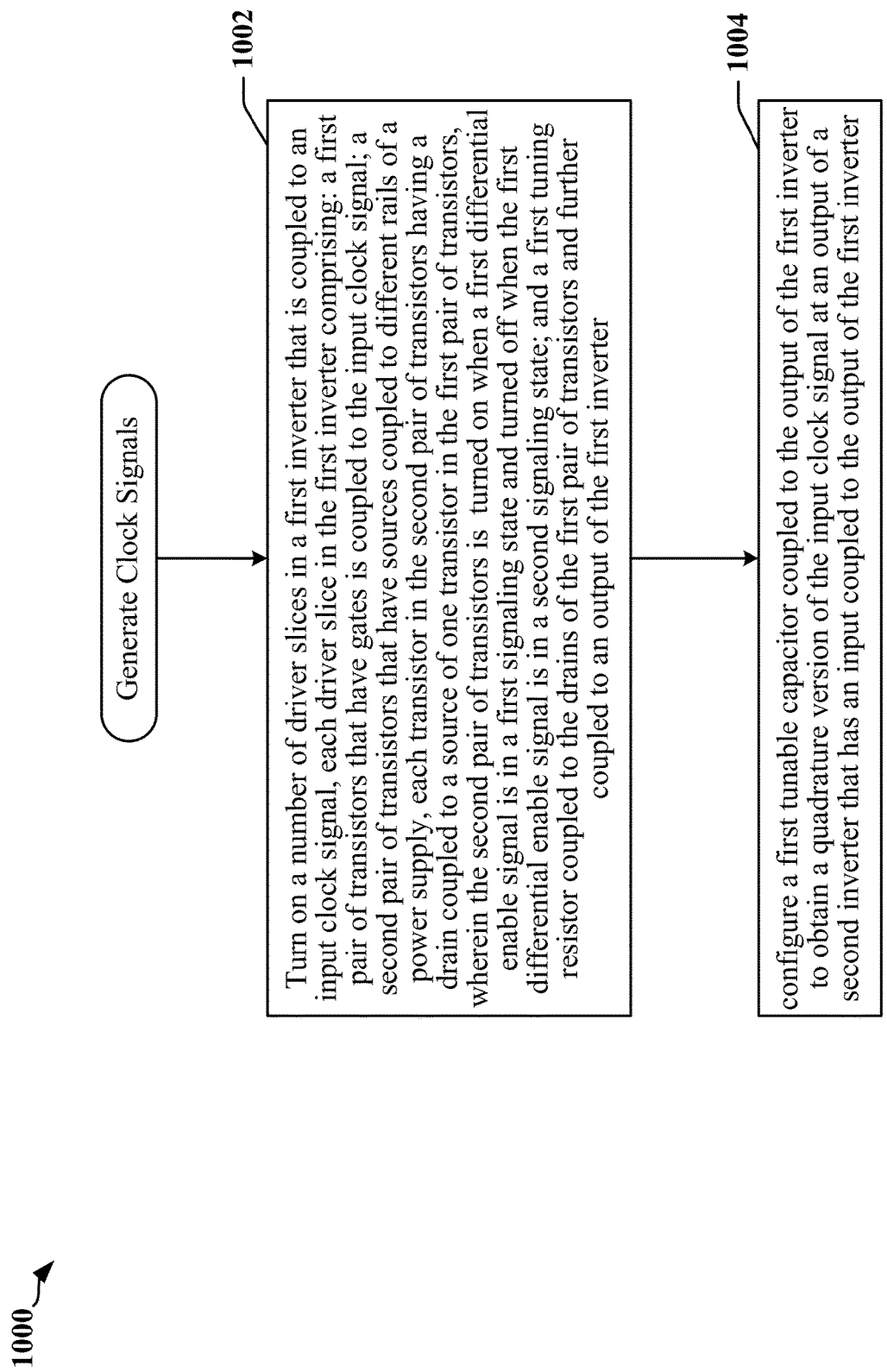
FIG. 10 is a flowchart of a method for generating clock signals in accordance with certain aspects of this disclosure.

FIG. 10 is a flowchart 1000 of a method for generating clock signals in accordance with certain aspects of this disclosure. The method may be performed using any of the delay cells disclosed herein. In some instances, the method may be implemented by or involve one or more processors or controllers.

At block 1002 in the illustrated method, a number of driver slices may be turned on in a first inverter that is coupled to an input clock signal. Each driver slice in the first inverter may include a first pair of transistors that have gates that are coupled to the input clock signal, a second pair of transistors, and a first tuning resistor coupled to the drains of the first pair of transistors. The drains of the first pair of transistors may be further coupled to an output of the first inverter. The second pair of transistors includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors. The second pair of transistors may be turned on when a first differential enable signal is in a first signaling state and turned off when the first differential enable signal is in a second signaling state. At block 1004 in the illustrated method, a first tunable capacitor coupled to the output of the first inverter may be configured to obtain a quadrature version of the input clock signal at an output of a second inverter that has an input coupled to the output of the first inverter.

The first tunable capacitor and the first tuning resistor in each turned-on driver slice in the first inverter are configured as an RC circuit.

In some implementations, configuring the first tunable capacitor includes providing a code in a first multibit select signal. The code may be configured to cause a plurality of switches to be closed. A plurality of capacitors is coupled between the output of the first inverter and a voltage rail of the power supply through the plurality of switches.

In some implementations, the second inverter includes a third pair of transistors that have gates that are coupled to the output of the first inverter, a fourth pair of transistors, a second tuning resistor coupled to the drains of the third pair of transistors and to an output of the second inverter, and a second tunable capacitor coupled to the output of the second inverter. The fourth pair of transistors includes a first transistor that has a source coupled to the higher voltage rail of the power supply and a drain coupled to a source of a first transistor in the third pair of transistors, and a second transistor that has a source coupled to the lower voltage rail of the power supply and a drain coupled to a source of a second transistor in the third pair of transistors. The fourth pair of transistors is turned on when a second differential enable signal is in the first signaling state and turned off when the second differential enable signal is in the second signaling state. A code provided in a second multibit select signal may be configured to cause one or more switches to be closed. One or more capacitors are coupled between the output of the first inverter and a voltage rail of the power supply when the one or more switches are closed.

In some implementations, a second tuning resistor couples the input of the second inverter to the output of the first inverter. A second tunable capacitor may be coupled to the input of the second inverter. The second tunable capacitor may include one or more switches controlled by a second multibit select signal, and one or more capacitors, each of the one or more capacitors being configured to be coupled between the input of the second inverter and a voltage rail of the power supply when a corresponding switch in the one or more switches is turned on. The second tuning resistor may include at least one switch controlled by a third select signal, and at least one resistor coupled between the output of the first inverter and the input of the second inverter. The resistor coupled between the output of the first inverter and the input of the second inverter may be coupled in parallel with another resistor when the at least one switch is turned on. In other implementations, the second tuning resistor has a fixed resistance value.

The method illustrated in FIG. 10 may be executed in or using an IC device. In one example, the IC device comprises an SoC. In another example, the IC device is included in one of multiple semiconductor dice mounted on a substrate. The IC device may be implemented as a chiplet in some instances.

The IC device may include a bus interface. The bus interface may include a clock generation circuit configured to generate a quadrature version of an input clock signal. The clock generation circuit may include a first inverter coupled to an input clock signal, a second inverter that has an input coupled to the output of the first inverter, and a first tunable capacitor coupled to the output of the first inverter. The second inverter outputs the quadrature version of the input clock signal. The first inverter includes multiple driver slices. The first tunable capacitor and the first tuning resistor in each turned-on driver slice in the first inverter are configured as an RC circuit.

In some implementations, each driver slice in the first inverter includes a first pair of transistors that have gates that are coupled to the input clock signal, a second pair of transistors, and a first tuning resistor coupled to the drains of the first pair of transistors and to an output of the first inverter. The second pair of transistors includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors. The second pair of transistors is turned on when a first differential enable signal is in a first signaling state and turned off when the first differential enable signal is in a second signaling state.

In some implementations, the first tunable capacitor includes a plurality of switches controlled by a first multibit select signal, and a plurality of capacitors. Each capacitor is configured to be coupled between the output of the first inverter and a voltage rail of the power supply when a corresponding switch in the plurality of switches is turned on.

In some implementations, the second inverter includes a third pair of transistors that have gates that are coupled to the output of the first inverter, a fourth pair of transistors, a second tuning resistor coupled to the drains of the third pair of transistors and to an output of the second inverter, and a second tunable capacitor coupled to the output of the second inverter. The fourth pair of transistors includes a first transistor that has a source coupled to the higher voltage rail of the power supply and a drain coupled to a source of a first transistor in the third pair of transistors, and a second transistor that has a source coupled to the lower voltage rail of the power supply and a drain coupled to a source of a second transistor in the third pair of transistors. The fourth pair of transistors is turned on when a second differential enable signal is in the first signaling state and turned off when the second differential enable signal is in the second signaling state. The second tunable capacitor may include one or more switches controlled by a second multibit select signal, and one or more capacitors. Each of the one or more capacitors is configured to be coupled between the output of the second inverter and a voltage rail of the power supply when a corresponding switch in the one or more switches is turned on.

In some implementations, a second tuning resistor couples the input of the second inverter to the output of the first inverter. A second tunable capacitor is coupled to the input of the second inverter. The second tunable capacitor includes one or more switches controlled by a second multibit select signal, and one or more capacitors. Each of these capacitors is configured to be coupled between the input of the second inverter and a voltage rail of the power supply when a corresponding switch in the one or more switches is turned on. In some instances, the second tuning resistor includes at least one switch controlled by a third select signal, and at least one resistor coupled between the output of the first inverter and the input of the second inverter. The resistor coupled between the output of the first inverter and the input of the second inverter is coupled in parallel with another resistor when the at least one switch is turned on. In some instances, the second tuning resistor has a fixed resistance value.

Some implementation examples are described in the following numbered clauses:

1. A clock generation circuit, comprising: a first inverter coupled to an input clock signal and comprising driver slices, each driver slice in the first inverter comprising: a first pair of transistors that have gates that are coupled to the input clock signal; a second pair of transistors that includes a first transistor a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors, wherein the second pair of transistors is turned on when a first differential enable signal is in a first signaling state and turned off when the first differential enable signal is in a second signaling state; and a first tuning resistor coupled to the drains of the first pair of transistors and further coupled to an output of the first inverter; a second inverter that has an input coupled to the output of the first inverter and that outputs a quadrature version of the input clock signal; and a first tunable capacitor coupled to the output of the first inverter.

2. The clock generation circuit as described in clause 1, wherein the first tunable capacitor and the first tuning resistor in each turned-on driver slice in the first inverter are configured as a resistance-capacitance (RC) circuit.

3. The clock generation circuit as described in clause 1 or clause 2, wherein the first tunable capacitor comprises: a plurality of switches controlled by a first multibit select signal; and a plurality of capacitors, each capacitor being configured to be coupled between the output of the first inverter and a voltage rail of the power supply when a corresponding switch in the plurality of switches is turned on.

4. The clock generation circuit as described in any of clauses 1-3, wherein the second inverter comprises: a third pair of transistors that have gates that are coupled to the output of the first inverter; a fourth pair of transistors that includes a first transistor that has a source coupled to the higher voltage rail of the power supply and a drain coupled to a source of a first transistor in the third pair of transistors, and a second transistor that has a source coupled to the lower voltage rail of the power supply and a drain coupled to a source of a second transistor in the third pair of transistors, wherein the fourth pair of transistors is turned on when a second differential enable signal is in the first signaling state and turned off when the second differential enable signal is in the second signaling state; a second tuning resistor coupled to the drains of the third pair of transistors and to an output of the second inverter; and a second tunable capacitor coupled to the output of the second inverter.

5. The clock generation circuit as described in clause 4, wherein the second tunable capacitor comprises: one or more switches controlled by a second multibit select signal; and one or more capacitors, each of the one or more capacitors being configured to be coupled between the output of the second inverter and a voltage rail of the power supply when a corresponding switch in the one or more switches is turned on.

6. The clock generation circuit as described in any of clauses 1-5, further comprising: a second tuning resistor that couples the input of the second inverter to the output of the first inverter; and a second tunable capacitor coupled to the input of the second inverter.

7. The clock generation circuit as described in clause 6, wherein the second tunable capacitor comprises: one or more switches controlled by a second multibit select signal; and one or more capacitors, each of the one or more capacitors being configured to be coupled between the input of the second inverter and a voltage rail of the power supply when a corresponding switch in the one or more switches is turned on.

8. The clock generation circuit as described in clause 6 or clause 7, wherein the second tuning resistor comprises: at least one switch controlled by a third select signal; and at least one resistor coupled between the output of the first inverter and the input of the second inverter, the at least one resistor being coupled in parallel with another resistor when the at least one switch is turned on.

9. The clock generation circuit as described in any of clauses 6-8, wherein the second tuning resistor has a fixed resistance value.

10. A method for generating clock signals, comprising: turning on a number of driver slices in a first inverter that is coupled to an input clock signal, each driver slice in the first inverter comprising: a first pair of transistors that have gates that are coupled to the input clock signal; a second pair of transistors that includes a first transistor a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors, wherein the second pair of transistors is turned on when a first differential enable signal is in a first signaling state and turned off when the first differential enable signal is in a second signaling state; and a first tuning resistor coupled to the drains of the first pair of transistors and further coupled to an output of the first inverter; and configuring a first tunable capacitor coupled to the output of the first inverter to obtain a quadrature version of the input clock signal at an output of a second inverter that has an input coupled to the output of the first inverter.

11. The method as described in clause 10, wherein the first tunable capacitor and the first tuning resistor in each turned-on driver slice in the first inverter are configured as a resistance-capacitance (RC) circuit.

12. The method as described in clause 10 or clause 11, wherein configuring the first tunable capacitor comprises: providing a code in a first multibit select signal, the code being configured to cause a plurality of switches to be closed, wherein a plurality of capacitors is coupled between the output of the first inverter and a voltage rail of the power supply through the plurality of switches.

13. The method as described in any of clauses 10-12, wherein the second inverter comprises: a third pair of transistors that have gates that are coupled to the output of the first inverter; a fourth pair of transistors that includes a first transistor that has a source coupled to the higher voltage rail of the power supply and a drain coupled to a source of a first transistor in the third pair of transistors, and a second transistor that has a source coupled to the lower voltage rail of the power supply and a drain coupled to a source of a second transistor in the third pair of transistors, wherein the fourth pair of transistors is turned on when a second differential enable signal is in the first signaling state and turned off when the second differential enable signal is in the second signaling state; a second tuning resistor coupled to the drains of the third pair of transistors and to an output of the second inverter; and a second tunable capacitor coupled to the output of the second inverter.

14. The method as described in clause 13, further comprising: providing a code in a second multibit select signal, the code being configured to cause one or more switches to be closed, wherein one or more capacitors are coupled between the output of the first inverter and a voltage rail of the power supply when the one or more switches are closed.

15. The method as described in any of clauses 10-14, further comprising: a second tuning resistor that couples the input of the second inverter to the output of the first inverter; and a second tunable capacitor coupled to the input of the second inverter.

16. The method as described in clause 15, wherein the second tunable capacitor comprises: one or more switches controlled by a second multibit select signal; and one or more capacitors, each of the one or more capacitors being configured to be coupled between the input of the second inverter and a voltage rail of the power supply when a corresponding switch in the one or more switches is turned on.

17. The method as described in clause 15 or clause 16, wherein the second tuning resistor comprises: at least one switch controlled by a third select signal; and at least one resistor coupled between the output of the first inverter and the input of the second inverter, the at least one resistor being coupled in parallel with another resistor when the at least one switch is turned on.

18. The method as described in any of clauses 15-17, wherein the second tuning resistor has a fixed resistance value.

19. An apparatus, comprising: means for configuring a first tuning resistor in a first inverter, including driver slices in the first inverter, each driver slice in the first inverter comprising: a first pair of transistors that have gates that are coupled to the input clock signal; a second pair of transistors that includes a first transistor a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors, wherein the second pair of transistors is turned on when a first differential enable signal is in a first signaling state and turned off when the first differential enable signal is in a second signaling state; and a first tuning resistor coupled to the drains of the first pair of transistors and further coupled to an output of the first inverter; a second inverter that has an input coupled to the output of the first inverter and that outputs a quadrature version of the input clock signal; and means for configuring a first tunable capacitor that is coupled to the output of the first inverter to obtain a quadrature version of the input clock signal at an output of a second inverter that has an input coupled to the output of the first inverter.

20. The apparatus as described in clause 19, wherein the first tunable capacitor and the first tuning resistor in each turned-on driver slice in the first inverter are configured as a resistance-capacitance (RC) circuit.

21. The apparatus as described in clause 19 or clause 20, wherein the means for configuring the first tunable capacitor comprises: a plurality of switches; and a plurality of capacitors coupled between the output of the first inverter and a voltage rail of the power supply through the plurality of switches, wherein each of the plurality of capacitors is coupled between the output of the first inverter and a voltage rail of the power supply when a corresponding one of the plurality of switches is closed.

22. The apparatus as described in any of clauses 19-21, wherein the second inverter comprises: a third pair of transistors that have gates that are coupled to the output of the first inverter; a fourth pair of transistors that includes a first transistor that has a source coupled to the higher voltage rail of the power supply and a drain coupled to a source of a first transistor in the third pair of transistors, and a second transistor that has a source coupled to the lower voltage rail of the power supply and a drain coupled to a source of a second transistor in the third pair of transistors, wherein the fourth pair of transistors is turned on when a second differential enable signal is in the first signaling state and turned off when the second differential enable signal is in the second signaling state; a second tuning resistor coupled to the drains of the third pair of transistors and to an output of the second inverter; and a second tunable capacitor coupled to the output of the second inverter.

23. The apparatus as described in clause 22, wherein the second tunable capacitor comprises: one or more switches controlled by a second multibit select signal; and one or more capacitors, each of the one or more capacitors being configured to be coupled between the output of the second inverter and a voltage rail of the power supply when a corresponding switch in the one or more switches is turned on.

24. The apparatus as described in any of clauses 19-23, further comprising: a second tuning resistor that couples the input of the second inverter to the output of the first inverter; and a second tunable capacitor coupled to the input of the second inverter.

25. The apparatus as described in clause 24, wherein the second tunable capacitor comprises: one or more switches controlled by a second multibit select signal; and one or more capacitors, each of the one or more capacitors being configured to be coupled between the input of the second inverter and a voltage rail of the power supply when a corresponding switch in the one or more switches is turned on.

26. The apparatus as described in clause 24 or clause 25, wherein the second tuning resistor comprises: at least one switch controlled by a third select signal; and at least one resistor coupled between the output of the first inverter and the input of the second inverter, the at least one resistor being coupled in parallel with another resistor when the at least one switch is turned on.

27. The apparatus as described in any of clauses 24-26, wherein the second tuning resistor has a fixed resistance value It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A clock generation circuit, comprising:
    a first inverter coupled to an input clock signal and comprising driver slices, each driver slice in the first inverter comprising:
        a first pair of transistors that have gates that are coupled to the input clock signal;
        a second pair of transistors that includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors, wherein the second pair of transistors is turned on when a first differential enable signal is in a first signaling state and turned off when the first differential enable signal is in a second signaling state; and
        a first tuning resistor coupled to the drains of the first pair of transistors and further coupled to an output of the first inverter;
    a first tunable capacitor coupled to the output of the first inverter; and
    a second inverter that has an input coupled to the output of the first inverter and that outputs a quadrature version of the input clock signal, wherein the second inverter comprises
        a third pair of transistors that have gates that are coupled to the output of the first inverter;
        a fourth pair of transistors that includes a first transistor that has a source coupled to the higher voltage rail of the power supply and a drain coupled to a source of a first transistor in the third pair of transistors, and a second transistor that has a source coupled to the lower voltage rail of the power supply and a drain coupled to a source of a second transistor in the third pair of transistors, wherein the fourth pair of transistors is turned on when a second differential enable signal is in the first signaling state and turned off when the second differential enable signal is in the second signaling state;
        a second tuning resistor coupled to the drains of the third pair of transistors and to an output of the second inverter; and
        a second tunable capacitor coupled to the output of the second inverter.

2. The clock generation circuit of claim 1, wherein the first tunable capacitor and the first tuning resistor in each turned-on driver slice in the first inverter are configured as a resistance-capacitance (RC) circuit.

3. The clock generation circuit of claim 1, wherein the first tunable capacitor comprises:
    a plurality of switches controlled by a first multibit select signal; and
    a plurality of capacitors, each capacitor being configured to be coupled between the output of the first inverter and a voltage rail of the power supply when a corresponding switch in the plurality of switches is turned on.

4. The clock generation circuit of claim 1, wherein the second tunable capacitor comprises:
    one or more switches controlled by a second multibit select signal; and
    one or more capacitors, each of the one or more capacitors being configured to be coupled between the output of the second inverter and a voltage rail of the power supply when a corresponding switch in the one or more switches is turned on.

5. The clock generation circuit of claim 1, further comprising:
- a second tuning resistor that couples the input of the second inverter to the output of the first inverter; and
- a second tunable capacitor coupled to the input of the second inverter.

6. A clock generation circuit, comprising:
- a first inverter coupled to an input clock signal and comprising driver slices, each driver slice in the first inverter comprising:
  - a first pair of transistors that have gates that are coupled to the input clock signal;
  - a second pair of transistors that includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors, wherein the second pair of transistors is turned on when a first differential enable signal is in a first signaling state and turned off when the first differential enable signal is in a second signaling state; and
  - a first tuning resistor coupled to the drains of the first pair of transistors and further coupled to an output of the first inverter;
- a second inverter that has an input coupled to the output of the first inverter and that outputs a quadrature version of the input clock signal;
- a first tunable capacitor coupled to the output of the first inverter;
- a second tuning resistor that couples the input of the second inverter to the output of the first inverter; and
- a second tunable capacitor coupled to the input of the second inverter, wherein the second tunable capacitor comprises:
- one or more switches controlled by a second multibit select signal; and
- one or more capacitors, each of the one or more capacitors being configured to be coupled between the input of the second inverter and a voltage rail of the power supply when a corresponding switch in the one or more switches is turned on.

7. A clock generation circuit, comprising:
- a first inverter coupled to an input clock signal and comprising driver slices, each driver slice in the first inverter comprising:
  - a first pair of transistors that have gates that are coupled to the input clock signal;
  - a second pair of transistors that includes a first transistor that has a source coupled to a higher voltage rail of a power supply and a drain coupled to a source of a first transistor in the first pair of transistors, and a second transistor that has a source coupled to a lower voltage rail of the power supply and a drain coupled to a source of a second transistor in the first pair of transistors, wherein the second pair of transistors is turned on when a first differential enable signal is in a first signaling state and turned off when the first differential enable signal is in a second signaling state; and
  - a first tuning resistor coupled to the drains of the first pair of transistors and further coupled to an output of the first inverter;
- a second inverter that has an input coupled to the output of the first inverter and that outputs a quadrature version of the input clock signal;
- a first tunable capacitor coupled to the output of the first inverter;
- a second tunable capacitor coupled to the input of the second inverter; and
- a second tuning resistor that couples the input of the second inverter to the output of the first inverter, wherein the second tuning resistor comprises:
- at least one switch controlled by a third select signal; and
- at least one resistor coupled between the output of the first inverter and the input of the second inverter, the at least one resistor being coupled in parallel with another resistor when the at least one switch is turned on.

8. The clock generation circuit of claim 5, wherein the second tuning resistor has a fixed resistance value.

9. The clock generation circuit of claim 6, wherein the second tuning resistor has a fixed resistance value.

* * * * *